(12) United States Patent
Heller et al.

(10) Patent No.: US 9,984,520 B1
(45) Date of Patent: *May 29, 2018

(54) FACILITY AND RESOURCE ACCESS SYSTEM

(71) Applicant: Good2Go LLC, San Francisco, CA (US)

(72) Inventors: Frances Heller, San Francisco, CA (US); Nicolas M. Bonnet, Palo Also, CA (US)

(73) Assignee: Good2Go, LLC, San Francisco, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/194,700

(22) Filed: Jun. 28, 2016

Related U.S. Application Data

(60) Provisional application No. 62/185,809, filed on Jun. 29, 2015, provisional application No. 62/267,410, filed on Dec. 15, 2015, provisional application No. 62/309,987, filed on Mar. 18, 2016.

(51) Int. Cl.
| | | |
|---|---|---|
| *G07C 9/00* | (2006.01) | |
| *H04W 4/00* | (2018.01) | |
| *E05C 3/12* | (2006.01) | |
| *H04J 3/06* | (2006.01) | |

(52) U.S. Cl.
CPC ............ *G07C 9/00166* (2013.01); *E05C 3/12* (2013.01); *H04W 4/008* (2013.01); *H04J 3/0641* (2013.01)

(58) Field of Classification Search
CPC .. G06F 1/14; E05B 57/00; E05C 3/12; G06Q 10/02; G06Q 10/06; G07C 9/00571; G08B 5/221
See application file for complete search history.

(56) References Cited

U.S. PATENT DOCUMENTS

| | | |
|---|---|---|
| 6,873,258 B2 | 3/2005 | Marples et al. |
| 7,701,331 B2 | 4/2010 | Tran |
| 7,941,337 B2 | 5/2011 | Vitrano, Jr. et al. |
| 8,175,913 B2 | 5/2012 | Checketts et al. |
| 8,254,953 B2 | 8/2012 | Mcbride et al. |
| 8,364,546 B2 | 1/2013 | Yenni et al. |

(Continued)

FOREIGN PATENT DOCUMENTS

WO    WO 2016/004304 A1    1/2016

OTHER PUBLICATIONS

Bajarin, T., "Meet Levi's Stadium, the Most High-Tech Sports Venue Yet," Time, Aug. 18, 2014, 4 pgs, accessed from http://time.com/3136272/levis-stadium-tech/.

(Continued)

*Primary Examiner* — Mirza Alam
(74) *Attorney, Agent, or Firm* — Frost Brown Todd LLC

(57) ABSTRACT

A system that allows an end-user to locate and gain access to a private facility, such as a restroom or other resource, without requiring that the end-user interact with any facility personnel. A mobile application allows a user to identify and proceed to a location where a private facility is available. When a user arrives at the location, the mobile application communicates with access control devices at the location to notify facility personnel of the user's presence and unlock doors or otherwise remove safeguards preventing general public access to the private facility.

16 Claims, 21 Drawing Sheets

(56) References Cited

U.S. PATENT DOCUMENTS

| | | | |
|---|---|---|---|
| 8,588,809 B2* | 11/2013 | Seavey | G06Q 10/06 455/420 |
| 8,676,615 B2 | 3/2014 | Callaghan et al. | |
| 8,903,425 B2* | 12/2014 | Guenec | G06Q 10/02 455/41.2 |
| 8,970,391 B2* | 3/2015 | Hoekstra | G07F 17/18 340/870.01 |
| 9,038,896 B2 | 5/2015 | Williams et al. | |
| 9,218,633 B2 | 12/2015 | Hulett et al. | |
| 9,247,520 B2 | 1/2016 | Malik | |
| 2002/0022896 A1* | 2/2002 | Dugan | G08B 5/221 700/83 |
| 2007/0286220 A1 | 12/2007 | Stenning | |
| 2009/0112638 A1* | 4/2009 | Kneller | G06Q 10/02 705/5 |
| 2012/0130775 A1 | 5/2012 | Bogaard et al. | |
| 2012/0130891 A1 | 5/2012 | Bogaard et al. | |
| 2012/0218122 A1 | 8/2012 | Bogaard | |
| 2012/0254804 A1 | 10/2012 | Sheha et al. | |
| 2013/0059598 A1 | 3/2013 | Miyagi et al. | |
| 2013/0073347 A1 | 3/2013 | Bogaard et al. | |
| 2013/0110561 A1 | 5/2013 | Checketts et al. | |
| 2014/0025499 A1 | 1/2014 | O'Donnell | |
| 2014/0239647 A1* | 8/2014 | Jadallah | E05C 19/002 292/140 |
| 2015/0058780 A1 | 2/2015 | Malik et al. | |
| 2015/0106150 A1 | 4/2015 | Soleimani | |
| 2015/0221139 A1 | 8/2015 | Bogaard et al. | |
| 2016/0005053 A1 | 1/2016 | Klima et al. | |

OTHER PUBLICATIONS

Bender, A., "The New Technology That Could Cut Public Restrooms Wait Times by 50%," Forbes, Jun. 30, 2014, 4 pgs., accessed from http://www.forbes.com/sites/andrewbender/2014/06/30/the-new-technology-that-could-cut-public-restroom-wait-times-by-50/print/.

Bhattarai, A., "End of the badge? These smart doors will open for you," The Washington Post, Capital Business, Jun. 3, 2015, 4 pgs., accessed from https://www.washingtonpost.com/business/capitalbusiness/with-new-hands-free-system-kastle-is-investing-big-in-office-security/2016/06/03/3f018a0a-2429-11e6-9e7f-57890b612299_story.html WaitTime, webpage 2016, 4 pgs., accessed from http://thewaittimes.com/.

U.S. Appl. No. 62/185,809, filed Jun. 29, 2015.
U.S. Appl. No. 62/267,410, filed Dec. 15, 2015.
U.S. Appl. No. 62/309,987, filed Mar. 18, 2016.

* cited by examiner

FACILITY AND RESOURCE ACCESS SYSTEM

PRIORITY

This application claims the benefit of U.S. provisional patent application 62/185,809, filed Jun. 29, 2015, U.S. provisional patent application 62/267,410, filed Dec. 15, 2015, and U.S. provisional patent application 62/309,987, filed Mar. 18, 2016, the disclosures of each of which are hereby incorporated by reference in their entirety.

FIELD

The disclosed technology pertains to a system for providing a user with streamlined access to a facility, or one or more resources within a facility, or both.

BACKGROUND

Travelers and locals want certainty, convenience and quality when searching for a facility or service, such as a restroom or other kind of facility. In some instances, consumers may pretend that they are legitimate customers in order to gain access to a retailer or hotel in order to avoid using a publicly available facility, due to concerns about cleanliness, maintenance, and safety. Over time, vendor locations such as coffee shops, cafes, gas stations, grocers, and other retailers in areas with heavy foot traffic may become "de facto" public restrooms. Allowing the general public access to private business facilities may create additional costs and risks, as well as concerns about controlling access without seemingly discriminatory policies, while giving the private facility no real benefit. Additionally, dealing with consumers that are unsure if they are welcome to use a given facility or not may lead to repeated awkward interactions between consumers and vendor employees, alienating potential customers and harming the efficiency of employees.

What is needed, therefore, is an improved system for managing consumer access to private facilities or resources in a way that is convenient and beneficial for both the consumer and the private facility owner or resource manager.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

Figure 1:
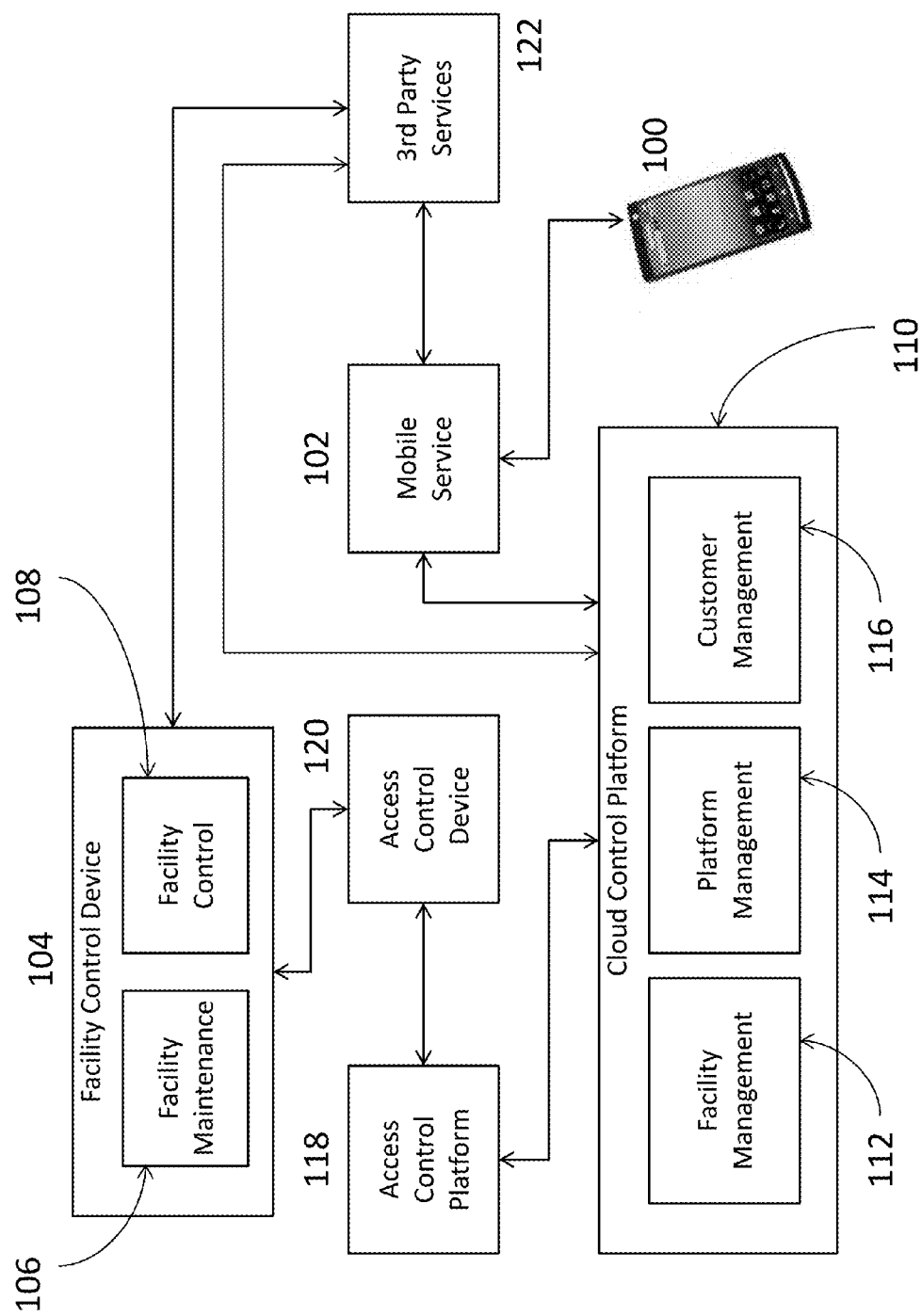
FIG. 1 is a schematic diagram showing an exemplary system configured to manage access to a private facility.

The inventors have conceived of novel technology that, for the purpose of illustration, is disclosed herein as applied in the context of a system for managing user access to a private facility, such as a restroom, resources at a private or public facility, or both. While the disclosed applications of the inventors' technology satisfy a long-felt but unmet need in the art of systems for managing access to a private facility, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting. It is contemplated that the teachings herein may be readily applied to various other contexts, including contexts that do not necessarily involve a restroom or similar facility. The example of a restroom as a private facility is being provided herein as just one merely illustrative example.

As used herein, a "private facility" should be understood to include an area or resource for which there is some restriction on the access or use of Examples may include a restroom, a parking garage, an office building, etc. A private facility may thus include an area with physical access controls such as a room barred by a locked door; but may also include an area with "soft" access controls such as a parking space for which entry is not physically barred, but in which a person may not be authorized to park except under certain conditions. Similarly, a private facility could be a room that is publicly accessible, but which contains resources that may have some restrictions placed on their use. This could include tangible devices such as, for example, a phone charging station that is inoperable until activated by an authorized user or a tire filling station that is inoperable until activated, but could also include more abstract resources such as a semi-automated ordering system that may be accessed by an authorized user to place an order for food or drink, or a semi-automated system for requesting or reserving services that may be accessed by an authorized user to reserve a dining table or parking spot. Private facilities may be permanently private, such as a restroom at a private establishment; or may only be temporarily private, such as a park or festival ground for which access is only controlled certain weekends during a year as a result of certain events. In other words, an otherwise public facility may be rendered at least partially "private" when access to at least a portion of the facility is at least partially restricted for at least some period of time. The foregoing examples of facilities are merely illustrative and are not intended to be limiting in any way. Various other suitable kinds of facilities will be apparent to those of ordinary skill in the art in view of the teachings herein.

Also as used herein, a "resource" should be understood to include hardware or other objects (e.g., a faucet, a toilet, a charging station, an elevator, etc.); people (e.g., a cashier, a person whom an invitee is scheduled to meet, etc.); and transactions (e.g., purchase of a cup of coffee or some other good, a request for service, etc.). The foregoing examples of resources are merely illustrative and are not intended to be limiting in any way. Various other suitable kinds of resources will be apparent to those of ordinary skill in the art in view of the teachings herein.

I. Exemplary System for Managing Access to a Secured Location

Turning now to the figures, FIG. 1 shows an exemplary system configured to manage access to a private facility. A user device (100) implements or is in communication with a mobile service (102). The user device (100) may be a tablet, smart phone, laptop computer, desktop computer, smart watch, standalone kiosk, vehicle infotainment system, or other device having similar or sufficient processing, storage, and communication capabilities. The mobile service (100) may be a mobile application, desktop application, website, web service, streamed application, virtual application, API, or other software or interface supporting similar or sufficient data handling and communication capabilities. The mobile service (102) supports user registration, subscription management and payment, geo-location, facility queuing, notifications, facility interactions, and facility feedback. Facility interactions may include, for example, unlocking or enabling a facility, or interacting with a feature or resource, such as turning lights on and off, turning audio or video devices on or off, or other interactions described herein or apparent to one of ordinary skill in the art in light of the disclosure herein. The mobile service (102) allows communication with a variety of third party services (122), as well as with a cloud control platform (110). Third party services (122) may include one or more third party systems, services, or devices, such as payment processing, geo-location, real time syncing, issue management, survey management, advertisement management, analytics, accounting, and other similar services.

The cloud control platform (110) may have a number of modules grouping together related functionality. Cloud control platform (110) modules may include a facility management module (112), a platform management module (114), and a customer management module (116), and other modules. The facility management module (112) groups functionality for one or more facilities, such as interaction, configuration, and communication with devices at a facility, facility monitoring, maintenance queue monitoring, and facility queue monitoring. The platform management module (114) groups functionality for managing the platform at a high level rather than for a particular facility or set of facilities, such as control and distribution of pricing, user access and authentication, workflow management, event monitoring, and queue characteristic configuration. The facility management module (112) groups functionality for managing particular customers, such as account review and management, subscription review and management, and payment review and management.

The cloud control platform (110) is also in communication with an access control platform (118) and one or more third party services (122). The access control platform (118) provides communication and interaction with an access control device (120), with the access control device (120) itself being in communication with a set of one or more facility control devices (104). The access control platform (118) may be a system and software that manages configuration and communication to a number of access control devices (120), and which associates a number of facility control devices (104) with a number of access control devices (120). The access control platform (118) may provide an API that can provide to and receive information from other devices or software, such as the access control device (120) and facility management module (112). The access control device (120) may be a system and software, typically installed at a single facility or shared between a number of nearby facilities, which can send and receive signals to devices at a facility based upon interactions with the access control platform (118). As an example, the facility management module (112) could maintain a list of configured control devices (104) across all facilities. An administrator could request a device status from a particular control device (104) at a particular facility. The facility management module (112) would generate a communication and transmit the communication to the access control platform (118). The access control platform (118) could verify the location of the device, and determine which access control device (120) the facility device was in communication with. The access control platform (118) could forward the communication to the appropriate access control device (120), which would poll the status of the device (104) in question, and then return the response via the access control platform (118) to the facility management module (112).

The facility control device (104) may be one or more devices such as a mobile phone, tablet, laptop computer, desktop computer, kiosk, or other device having similar processing, storage, and communication capabilities. The facility control device (104) may have one or more modules grouping functionality, such as a facility maintenance module (106), a facility control module (108) or other modules. The facility maintenance module (106) could include image capture capabilities, for documenting cleanliness and maintenance issues, maintenance checklists and management tools, maintenance training videos and information, and maintenance ticket creation, review, and management. The facility control module (108) could include branding configuration and management, including the selection and display of branding materials, marketing configuration and management, including messaging, promotional offers, and partner offers, and access control functionality, including the ability to enable and disable facilities and devices, grant temporary access, activate a temporary access card or device, and other functionality.

While FIG. 1 shows one possible configuration of systems, devices, and functionality, it should be understood that various different configurations may be desirable depending upon a particular implementation and desired result, such as maximizing speed or reliability by organizing components in a different manner, or minimizing cost by removing or combining components, with such variations being apparent to one of ordinary skill in the art, in light of this disclosure. It should also be understood that one or more of the systems or components in FIG. 1 may have additional elements such as power sources, storage devices, databases, communication devices, or other components necessary to perform the disclosed functions. Communication between devices may in some instances be wired communication, such as Ethernet, fiber optic, USB, or other wired connection, but may also be wireless, such as Wi-Fi, Bluetooth, radio, infra red, NFC, or other wireless connections, with the choice of a specific connection between two devices being dependent upon the particular implementation and environment of use.

Figure 2:
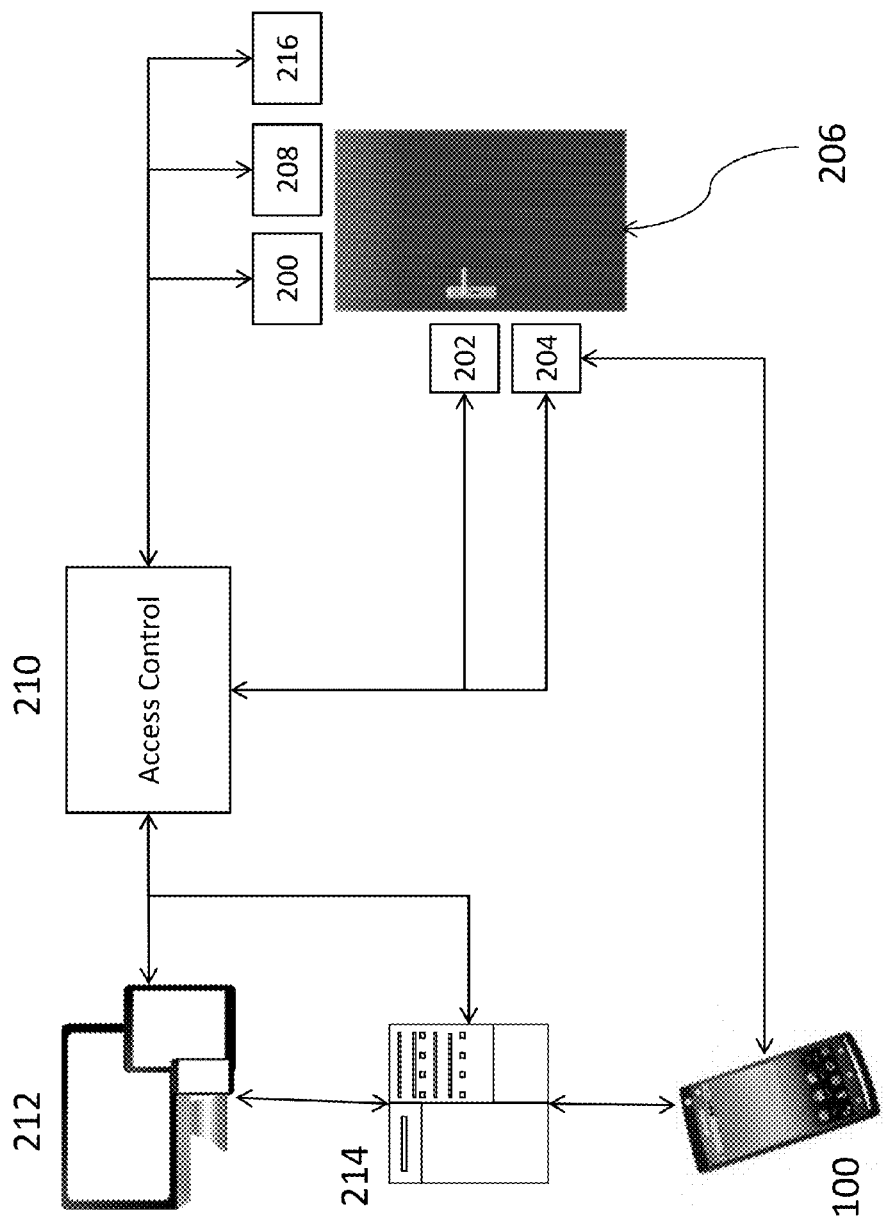
FIG. 2 is a schematic diagram showing an exemplary configuration of devices for managing access to a private facility.

Turning now to FIG. 2, that figure shows an exemplary configuration of devices for managing access to a private facility. While sharing some similarities with FIG. 1, this FIG. 2 is focused more on devices at a particular facility itself, with some already described elements being abstracted. It should therefore be understood that the components shown in FIG. 2 may overlap with the components shown in FIG. 1. For example, a set of remote systems (214) should be understood to be an abstracted view of cloud control platform (110) and $3^{rd}$ party services systems (122), while access control (210) should be understood to be an abstracted view of access control platform (118) and access control device (120), and facility devices (212) should be understood to be an abstracted view of facility control device (104), facility maintenance module (106) and facility control module (108). In the example shown in FIG. 2, the user device (100) communicates with the remote systems (214) directly, but does not communicate directly with the access control (210) or the facility devices (212). User device (100) may also communicate with facility access panel (204) via short range wireless communications such as Bluetooth, NFC, RFID detection, infrared, or other means. In the present example, the facility has a controlled entrance, a facility door (206), but it should be understood that not all facilities will have a facility door (206). For example, while a restroom facility may have a facility door (206), a tire inflation facility may not. The facility door (206) may have installed nearby a facility access panel (204), automatic lock (202), automatic opener (200), motion detector (208), and facility user devices (216).

The automatic opener (200) may be installed with the facility door (206) so that when a communication is received from the access control (210) indicating the facility should be opened, the automatic opener (200) can activate and open the facility door (206). The automatic lock (202) may be installed with the facility door (206) so that when a communication is received from the access control (210) the lock (202) can be latched or unlatched as required. The facility access panel (204) may be installed near the door and communicate with the user device (100) to verify a user's arrival at the facility. Interaction between a user device (100) and access panel (204) may result in a communication to the access control panel (210) and, for example, cause the electronic door lock (202) to unlatch and the door opener (200) to open the door.

The motion detector (208) may be installed near or within a facility, and may be used to detect the presence of someone within the facility without compromising privacy in the way a camera might, or could activate lighting, air circulation, or other devices based upon motion within or near the facility by communicating with the access control (210). The facility user devices (216) may include a variety of devices and fixtures, such as a vacuum cleaner, tire inflator, air conditioner, car wash soap and water sprayer, audio device, video device, computer, sink, shower or toilet water supply, soap dispenser, product dispenser, sample dispenser, communication device, Wi-Fi access point, charging station, power supply, massage chair, or other similar device. Facility user devices (216) may be enabled and disabled based upon a communication from access control (210).

Using a restroom within a private vendor, such as a coffee shop, as an example, a user device (100) could be placed within the proximity of a facility access panel (204). The user device (100) could retrieve a unique identifier or authentication code from a remote system (214) and communicate the authentication code to the facility access panel (204), which can communicate the authentication code to access control (210), verifying that the user device (100) is both present at the facility, and authorized to access the facility. With verification complete, access control (210) can unlatch the automatic lock (202), open the facility door (206) via the automatic opener (200), and enable the facility user devices (216), such as the water supply for the toilet and sink, the restroom lights, an air circulator, a television or radio, or a partner product sample dispenser. When the user exits the restroom, the user device (100) may interface with the facility access panel (204) to notify access control (210) that the facility is now empty, causing the door opener (200) to close the door, the lock (202) to latch, and the facility user devices (216) to be disabled. The motion detector (208) may provide verification that the facility is in fact vacant before closing and locking the facility, or may be used to trigger actions after a passage of time with no motion, in the event that a user exits the facility without activating the facility control panel, so that the facility may be secured at all times when not in use.

The above described devices in communication with the access control (210) may also be actuated, enabled, disabled, triggered, or otherwise manipulated via the facility devices (212) or remote systems (214). For example, a facility device (212) such as a tablet in possession of a cashier may be used to manually unlock, open, or enable a facility to allow someone without a user device (100) to access the facility. This could be useful to allow patrons, cleaners, technicians, inspectors, or others access to the facility without requiring that they have a user device (100) configured with the mobile service (102). Such access could also be granted by way of activating a disposable card with an embedded RFID or other indicator that can be detected by the facility access panel (204) to grant access. A temporary access card could be activated via a facility device (212) and configured to allow access a certain number of times, or over a certain period of time. Similarly, a remote system (214), such as the facility management module (112) could communicate to access control (210) and trigger any of the devices. Such functionality could allow the facility management module (112) to remotely grant access to a cleaner or technician without interrupting the facility vendor's employees, could be used to disable all access to a facility in the event of a major maintenance need, or could be used to test the connected facility devices for operational status and performance.

As with FIG. 1, FIG. 2 just shows one example of a possible configuration of systems, devices, and functionality; and should be understood that various different configurations may be desirable, that the systems or components in FIG. 2 may have additional elements necessary to perform the disclosed functions, and that method of communication will vary by implementation and environment. In particular, some facilities may not have a facility door (206), lock (202), access panel (204), opener (200), motion detector (208), or facility user devices (216). A facility in a parking lot, such as a tire inflator, may not have any physical access restrictions (200, 202, 204, 206), but may have a motion detector (208) and facility user device (216) to be activated. A restroom facility may have a facility door (206), but need not have a facility access panel (204) or opener (200). In this case, the user device (100) could use geo-location to indicate arrival at a facility, and automatically grant access to the facility, or could prompt a vendor employee via a facility device (212) to manually grant access, or a user action via the user device (100) indicating presence at the facility could be communicated via a remote system (214) to access control (210) to grant access to the facility. It should also be understood that the system of FIG. 2 could be configured for use in both permanent installations as well as temporary/portable installations. This could be useful at an outdoor concert venue, fairground, worksite, farmer's market, or other area where temporarily deployed, access controlled facilities may be useful. By way of example only, a private facility as described herein may include a portable restroom or similar portable structure where private access may be desired. Other variations in method of granting access to a facility and hardware configuration and components exist and will be apparent to one of ordinary skill in the art in light of this disclosure.

II. Exemplary Methods for Managing Access to a Secured Location

Figure 3:
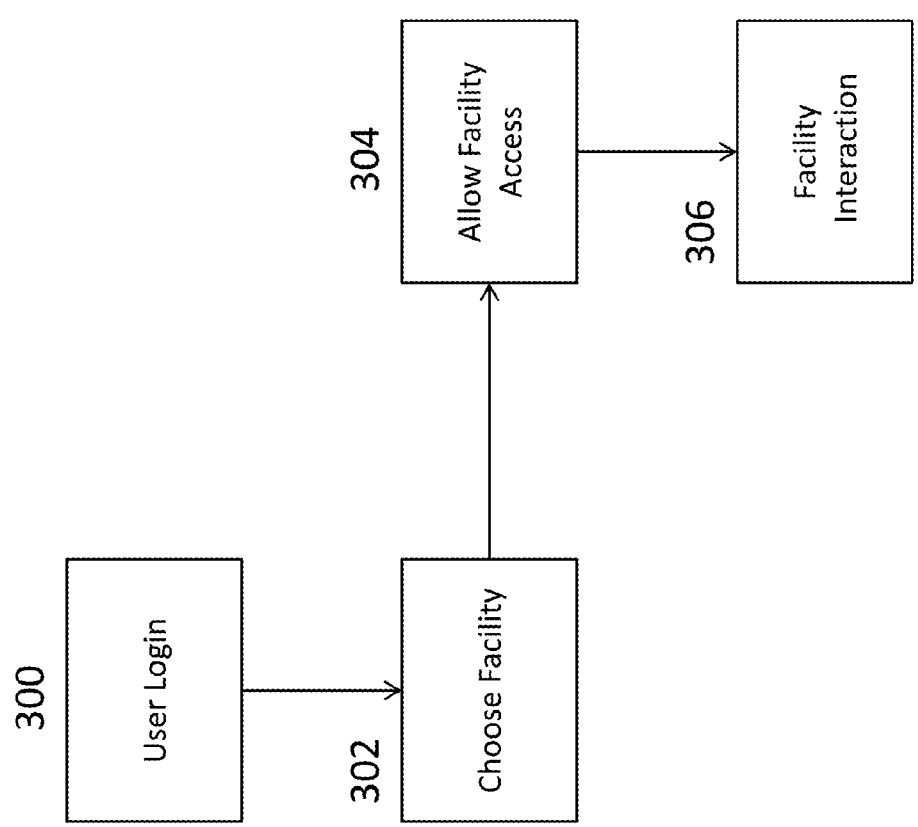
FIG. 3 is a flowchart of a set of high-level steps that a system could perform to manage consumer-user interactions with the disclosed system.
Figure 9:
FIG. 9 is an example of an interface for viewing facilities.
Figure 10:
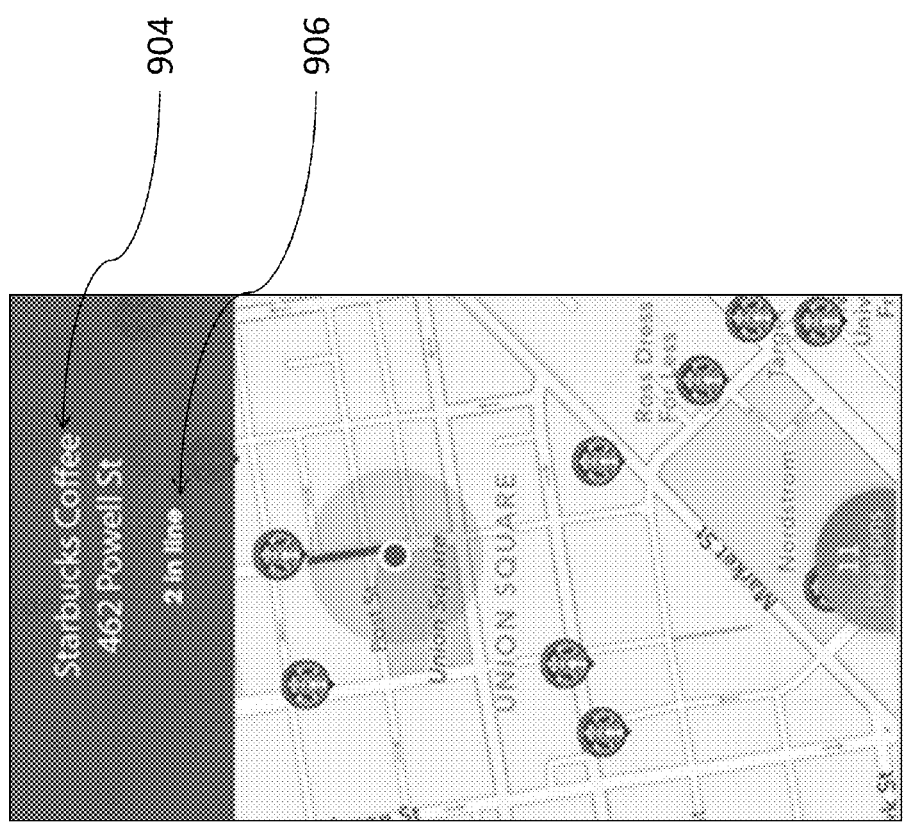
FIG. 10 is an example of an interface for choosing a facility.

Turning now to FIG. 3, that figure shows a flowchart of a set of high-level steps that a system could perform to manage consumer-user interactions with the disclosed system. In this example, consumer-user interactions with the system are primarily via the user device (100) and mobile service (102). In some versions, access to the mobile service and private facilities will be controlled be a user login (300) and may involve a registration and subscription process prior to using the system. Once a user is registered and authenticated to use the system, or is otherwise able to use the system, the user may choose a desired facility (302). This could be accomplished via, for example, an interface such as that shown in FIGS. 9-10, displayed via the user device (100). A user's current position (900) is shown, as well as one or more nearby facilities (902) that a user can access. The name and location of the facility (904) may be displayed, as well as the availability (906) of the facility to aid in a user's decision. It should be understood that FIGS. 9-10 are examples only, and that any particular implementation of the facility search and selection interface could have different features. For example, the example of FIG. 9 could show an indicator of the number of people queued at a location by using a number, color, a size based indicator such as an icon that is scaled to be larger or smaller depending upon the number of people in a queue for that facility, or another symbol, text, or visual identifier. FIG. 10 could similarly display availability (906) in a variety of ways as described above.

Figure 11:
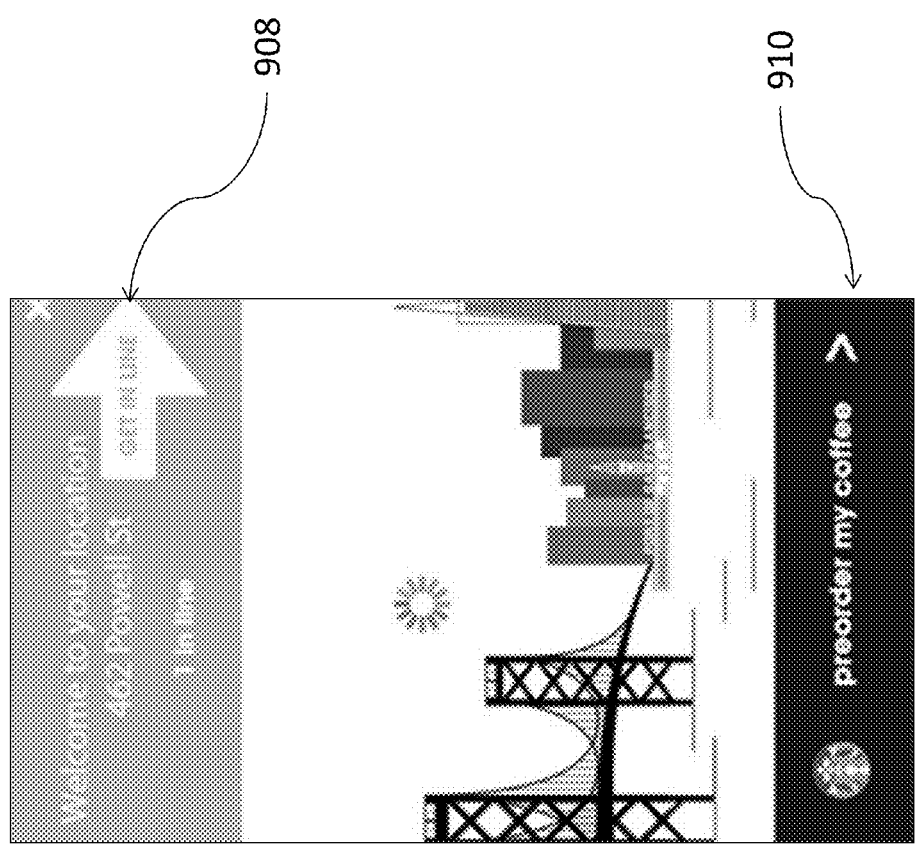
FIG. 11 is an example of an interface for signaling arrival at a facility.
Figure 12:
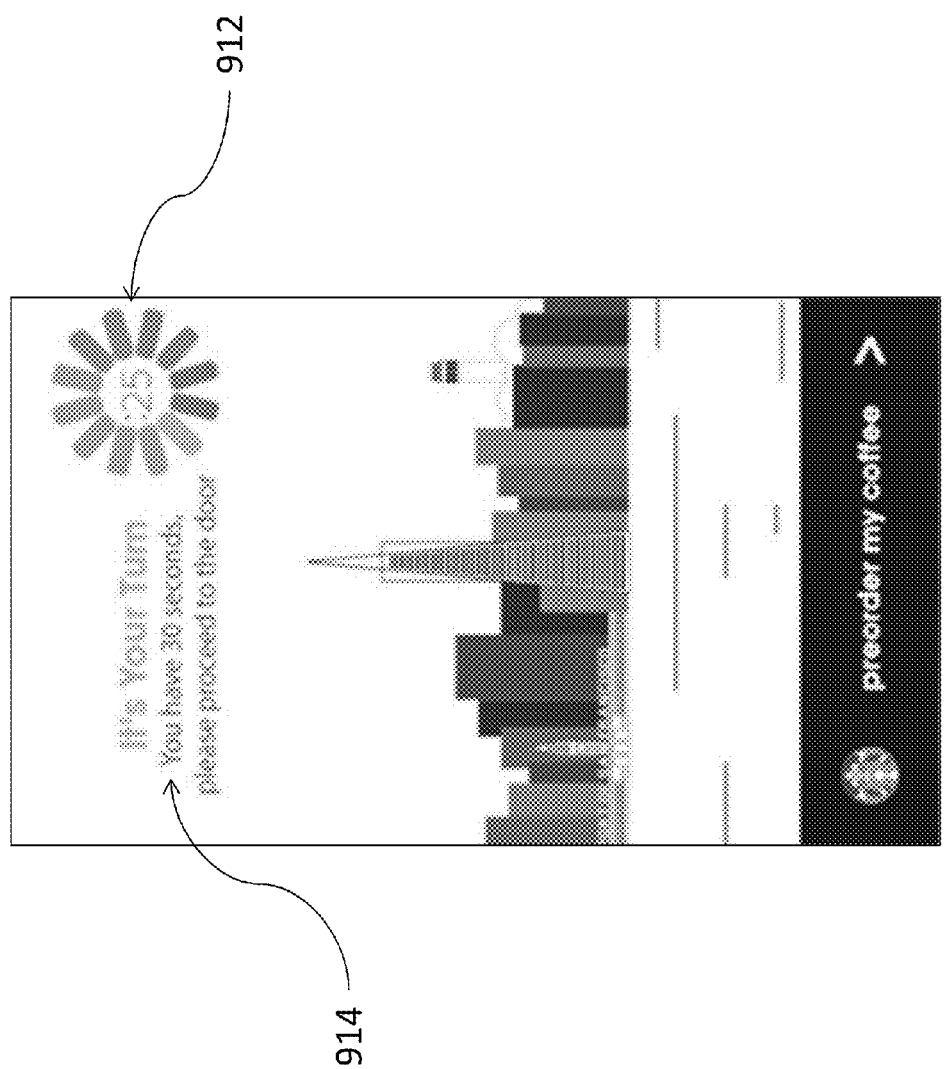
FIG. 12 is an example of an interface for signaling the facility is available.
Figure 13:
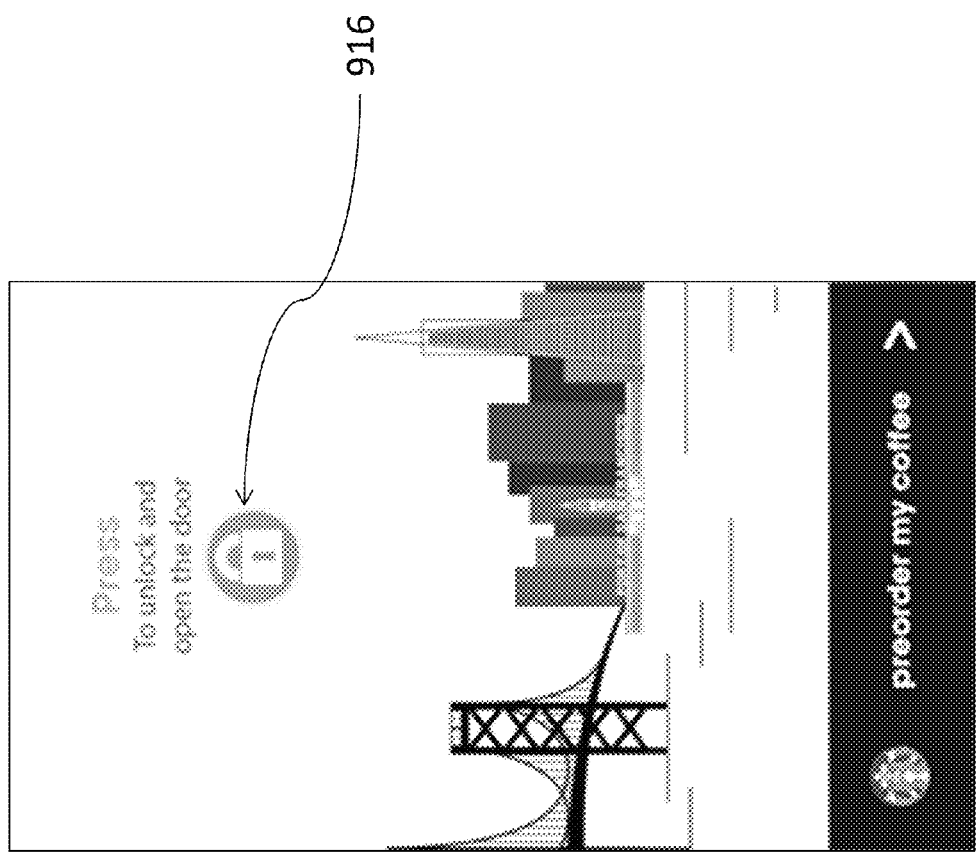
FIG. 13 is an example of an interface for enabling and accessing a facility.

When a user arrives at a facility, the system allows a user to gain access (304) to the facility, via an interface such as that shown in FIGS. 11-13. A check-in button (908) allows a user to enqueue for the location while traveling to the location, or upon arriving at the location, depending upon the particular version. Location specific features may be available, such as the ability to preorder (910) goods or services from the vendor while traveling to the location or using the facility. When both the user and the facility are ready for the user to enter, a message giving instructions for entering the facility (914) as well as a time limit (912) for accessing the facility may be displayed. Additional controls may be displayed depending upon a particular version and implementation, such as the ability to unlock a door via the user device (100) when a facility access panel (204) is not available or other semi-automated processes have not been implemented.

Figure 14:
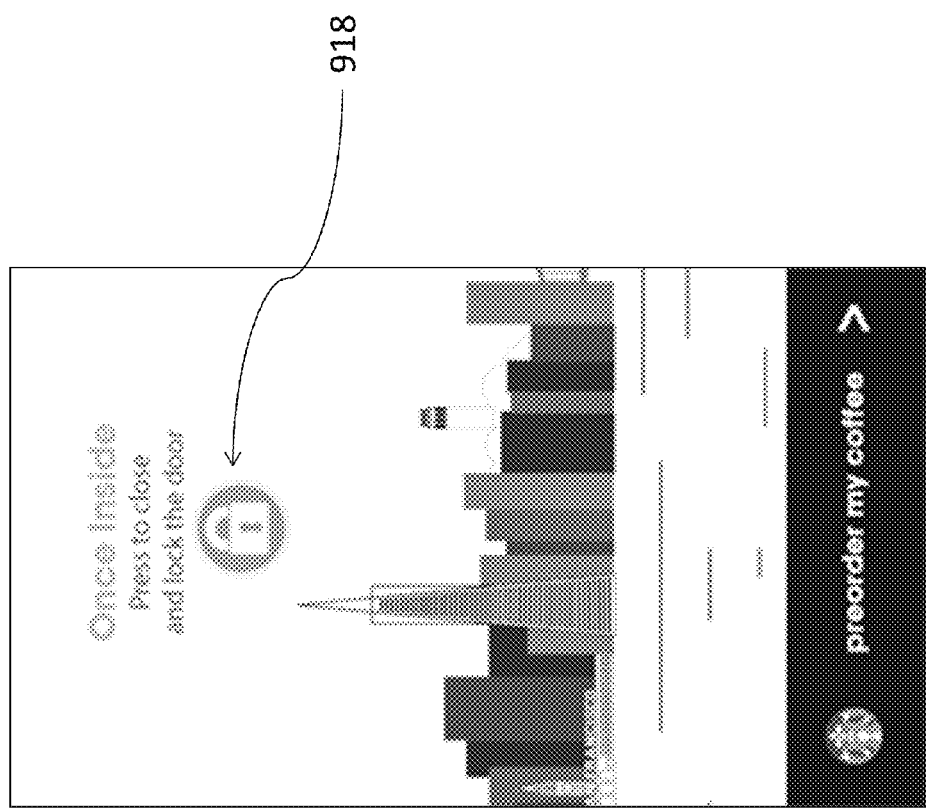
FIG. 14 is an example of an interface for securing a facility during use.
Figure 15:
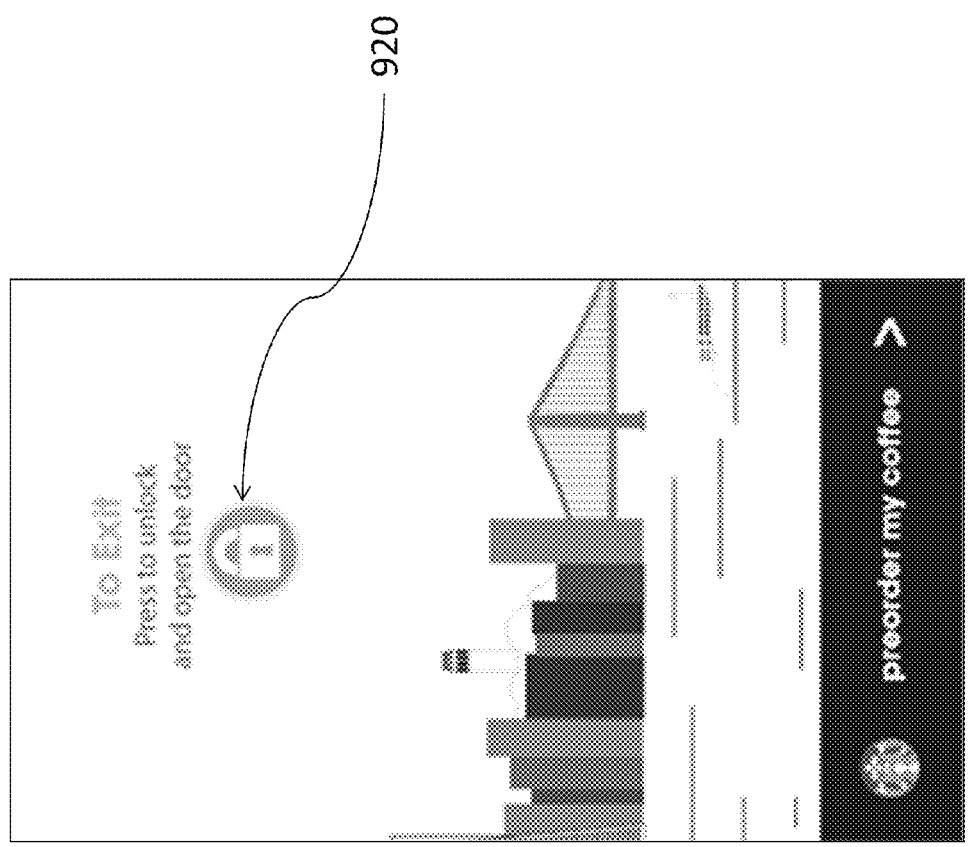
FIG. 15 is an example of an interface for exiting a facility.
Figure 16:
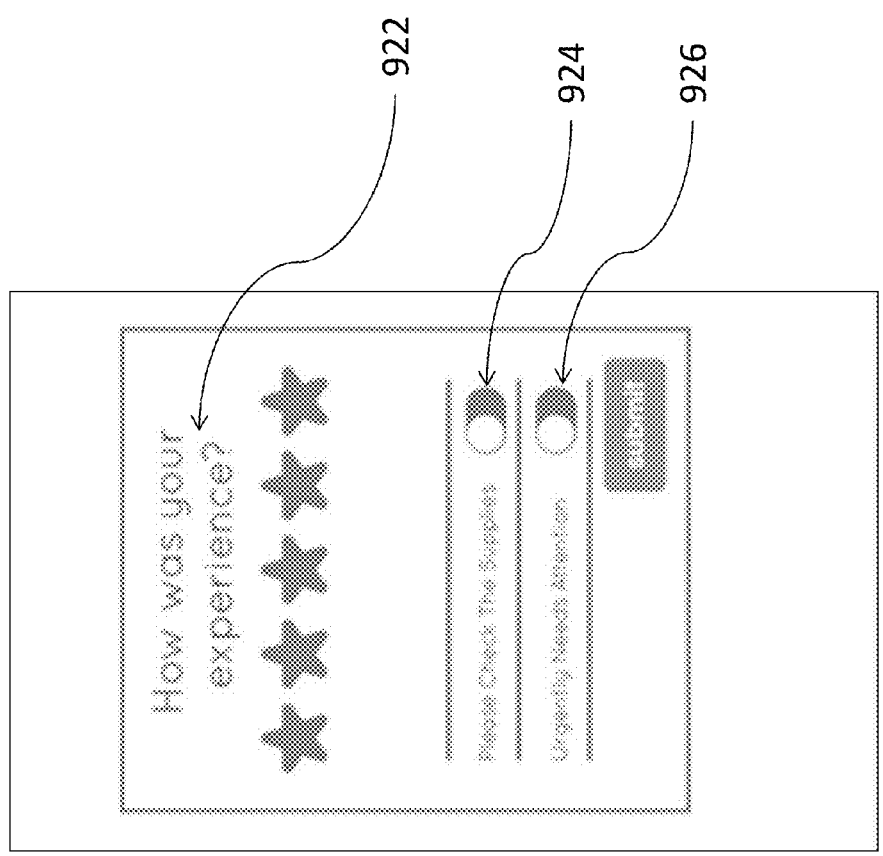
FIG. 16 is an example of an interface for providing facility feedback.

Once inside the facility, a user may have various interactions (306) with the facility, via an interface such as the one shown in FIGS. 14-16. If the user desires, the facility door (206) may be locked (918) from the inside to allow uninterrupted use. Once use of the facility is complete, the facility door (206) may be unlocked or the system may be notified that a user is exiting (920). During use or upon exiting, a user may provide feedback on the facility, including overall experience (922), facility supply quality and quantity (924), significant maintenance issues (926), or other feedback as desired and configured.

Figure 4:
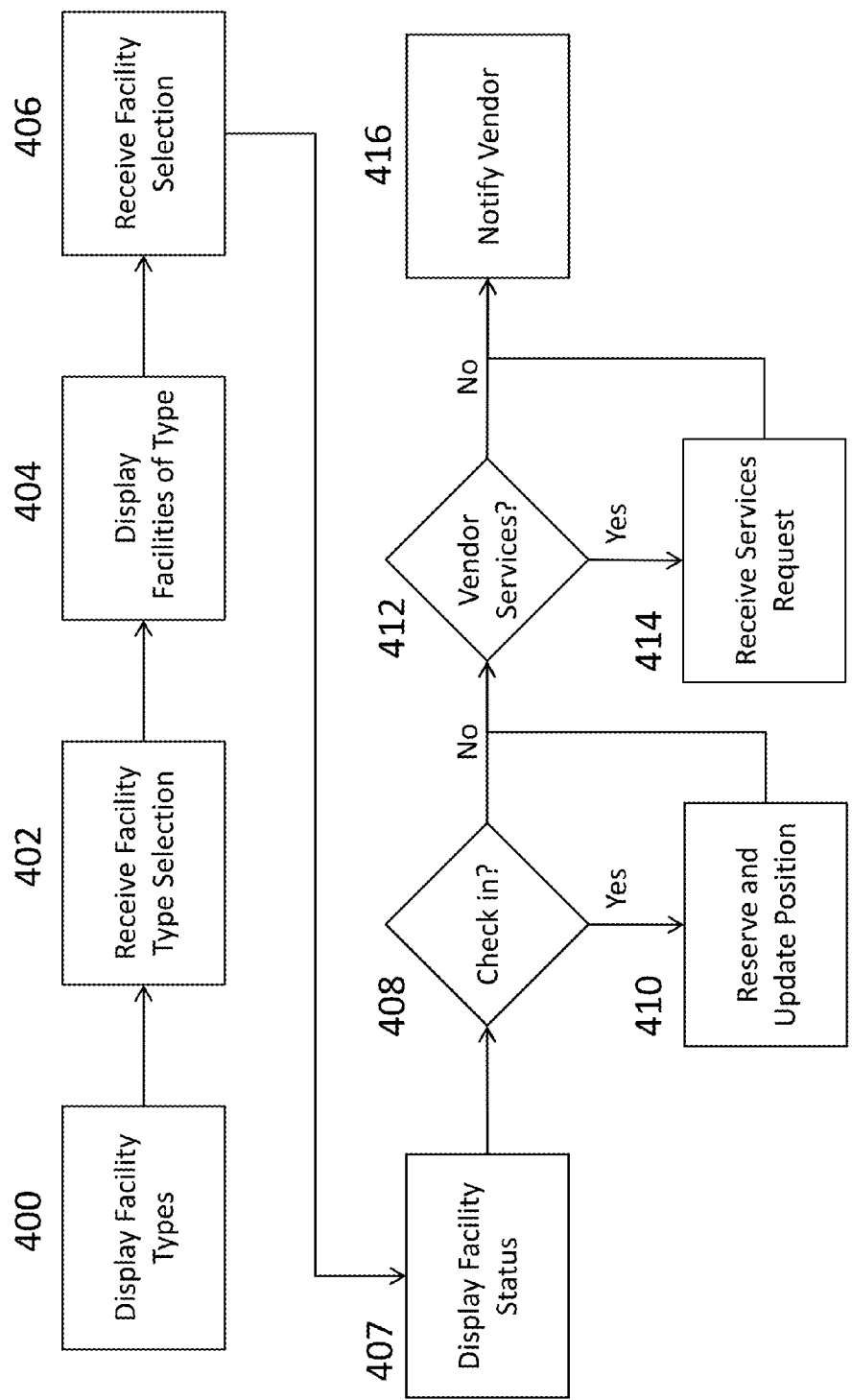
FIG. 4 is a flowchart of a set of steps that a system could perform to allow a user to select a private facility for use.

Turning now to FIG. 4, that figure shows a flowchart of a more detailed set of steps that a system could perform to allow a user to select a private facility (302) for use. When a user is logged in (300), authenticated, or otherwise able to use the mobile service (102), an interface may be displayed via the user device (100) showing the different types of private facilities (400) that a user may access. Types of facilities displayed (400) could include restrooms, showers, car washes, car cleaning stations, car maintenance stations, meeting rooms, internet cafes and lounges, telephone booths, charging stations, offices, study rooms, gyms, medical care providers, or other similar facilities that may be available on a private vendor's property and that the vendor might wish to offer limited access to for a group of users. A facility type selection is received (402) from the user via the user device (100) and communicated to the cloud control platform (110) and third party services (122) in order to identify the user's current location via geo-targeting of the user device (100) internet protocol address, GPS signal, signal triangulation, or other locating means, and to access a list of participating private facilities of the chosen type within a configurable distance of the user's current location.

Once a list of nearby participating private facilities of the selected type is available, the list is displayed (404) via the user device (100) and an interface such as the one shown in FIG. 9. A user selection of a particular private facility is received (406) via the user device (100) in communication with the cloud control platform (110), and a facility status is displayed (407) to the user for the selected facility via an interface such as the one shown in FIG. 10. Facility status (407) may include, for example, the distance between the user's current location and the facility location, the number of other users waiting for the facility, the name, type, street address, phone number, and other information of the vendor hosting the facility, ratings and reviews for the facility, special offers or promotions available at the facility, as well as step-by-step navigational directions for reaching the facility.

In the present example, while a user is proceeding to a selected facility or upon arrival at a facility, a user may have the option to check in (408) for the facility in order to reserve their position in the facility queue. If a user chooses to check in (408), the cloud control platform (110) will reserve their position (410) in the queue so that other users selecting to use the facility will be placed in the queue behind users who previously checked in. In some versions, a user's position in the queue may be controlled by other factors such as proximity to the destination facility during travel, speed of travel, user account and subscription features, number of users in queue, total time a user has spent in queue, or another priority or position provided or configured by one or more users. If the user chooses not to manually check-in via the user device (100), their position in the queue may not be reserved until they arrive at the location and are checked in via another process.

Other features may also be available after a particular facility is selected. For example, vendor services or goods may be offered (412) by the vendor hosting a facility, which can be requested via the user device while a user travels to the location or uses the facility, such as in FIG. 11 where a user can pre-order coffee (910) while waiting for the facility to become available. If a user chooses to pre-order goods or services, a services request is received (414) via the user device, and communicated to the cloud control platform (110). Facility selections (406), check in (410), and services (414) information may then be communicated by the cloud control platform (110) to the facility devices (212) so that employees at the vendor location are aware that users may be arriving to use a facility, or that goods or services should be prepared to coincide with the users' arrival. Not all facilities or vendors may support checking in (408) or requesting vendor services and goods (412) while traveling to a location, or even upon arriving at a location.

Figure 5:
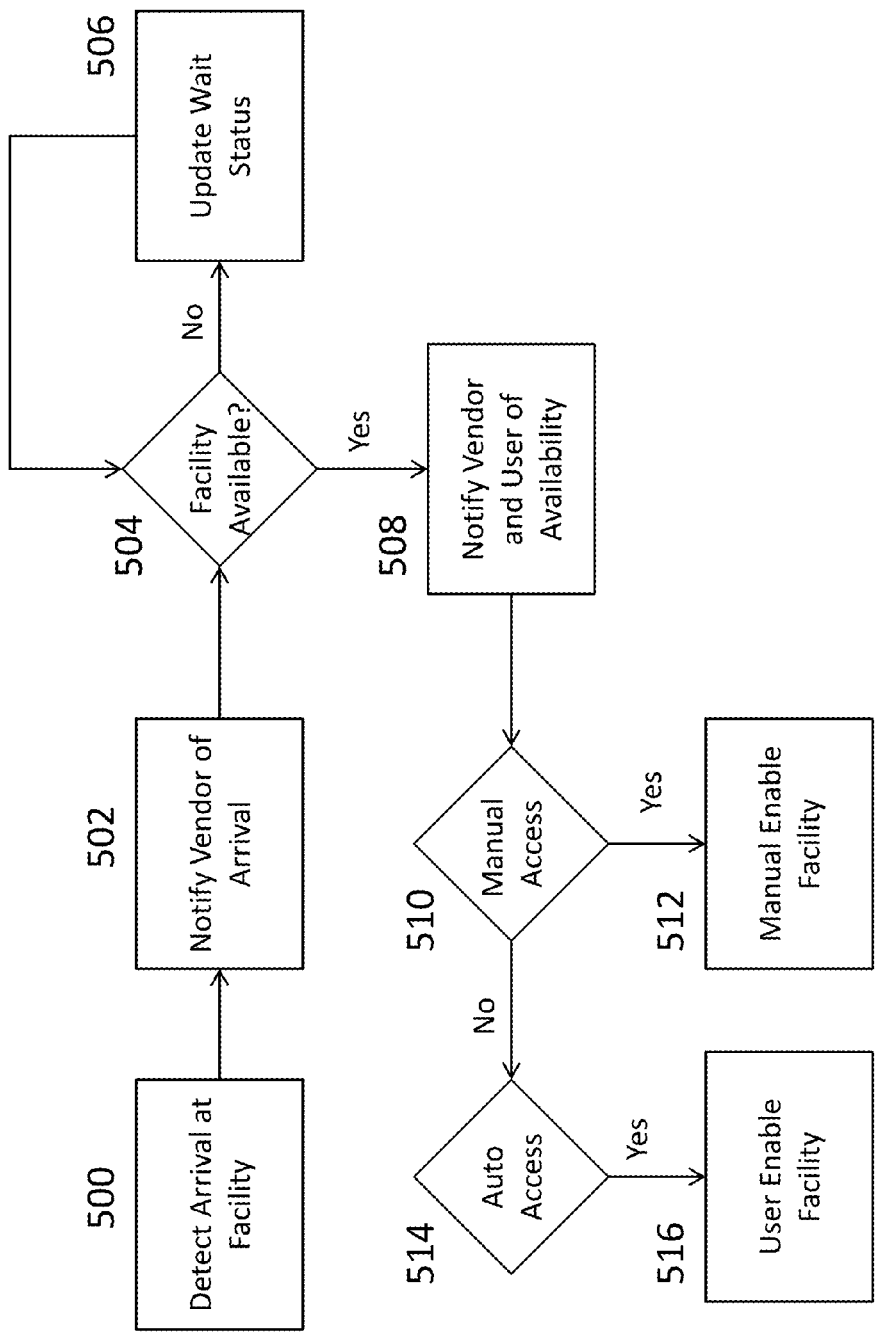
FIG. 5 is a flowchart of a set of steps that a system could perform to allow a user to enter a facility.

Turning now to FIG. 5, that figure shows a flowchart of a more detailed set of steps that a system could perform to allow a user to access a facility (304). Some facilities may be configured with hardware allowing them to detect (500) the arrival of a user at a facility. This could include automated communication between the user device (100) and the access control device (120) via Wi-Fi, Bluetooth, RFID, or other communication means in order to either determine the user device's (100) presence at the facility or receive a signal from the user device (100), such as a GPS coordination, indicating presence at the facility, or could include an additional manual step via the user device (100) to signal arrival at the facility. When a user has arrived at the location, the vendor may be notified (502) so that any requested goods or services can be delivered, and so that the vendor is aware that someone may be accessing the private facility so that awkward exchanges or questioning can be avoided. If the facility is not immediately available (504) when a user arrives at a location, such as where another user is occupying the facility, or where one or more users are in the facility queue ahead of the recently arrived user, the user may affirmatively elect to join the facility queue via the user device and will receive regular status updates (506) via the user device indicating such information as number of users in queue, estimated time till availability, and alternate facility choices. When the facility does become available, the user and vendor may be notified (508) that the facility has become available so that the user can proceed to the facility entrance, or so that the vendor may perform maintenance, cleaning, or supply stocking tasks.

While FIG. 4 shows an embodiment of the technology where a user may check in (408) and reserve a position (410) from a remote location, such as while walking towards a facility on city sidewalks, the technology disclosed herein may also be used to implement an embodiment where a user selects a facility via an interface such as that shown in FIG. 10 but does not remotely check in (408) or reserve a position (410). Instead, check in could occur automatically when the user actually arrives at the facility and is detected (500) based upon a GPS coordinate or a successful short range wireless transmission between a device at the facility and the user device (100). Such an implementation might be desirable in order to prevent speculative remote check in, such as where a user might need to use the facility sometime in the next several hours and reserves a position without any intent of proceeding directly to the facility. Such speculative queueing could reduce the system's ability to provide accurate wait times for other users of the facility, and could lead to users that are present in the facility being delayed due to a user that is not at the facility or may never arrive at the facility. By only allowing check in (408) and position reservation (410) after a user's arrival is detected (500) the chance of speculative queuing is reduced, especially if the system were configured to detect when the user departs the location, based upon GPS or short range wireless connection, and remove them from the queue.

When the user has arrived at the entrance of the facility, in some cases a facility door (206), either a manual access (510) or an automatic access may occur (514). Where a facility does not have the required hardware to enable automatic access (514), or where a user needs assistance, or is having some difficulty using their user device (100) to gain automatic access, a manual access (510) can manually enable the facility devices, unlock and open the facility door, and provide facility access (512). Manual facility access will generally require the action of a vendor employee, and may be granted by a facility device (212), such as a tablet used by an employee, by a kiosk placed behind the counter, or by interaction with another device by an employee. Manual facility access may also be granted by providing a disposable card or loaned device that may interact with a facility access panel (204) via RFID or other wireless communication and grant access to a facility. Such a card or device may be reusable a limited number of times, or may only be useable once until re-activated or recharged, or may only be useable for a limited time frame beginning at the point that it is first activated or first used. Manual facility access may also allow a person with no user device (100) to access a facility. For example, a person could enter the location and inquire about the use of a facility, and be given a printed QR code on a receipt or card. Printing the access code might cause the user to be placed in the queue, and a display near the facility could represent the queue with a first icon for users who have checked in via a user device (100), and a second icon for users who have checked in by being given a printer code, with the second icon also identifying by a unique number or identifier where each printed code user is within the queue.

If automatic access is possible (514), the user may enable and access the facility (516) without the assistance of a vendor employee. The user may enable and access the facility by an interaction with an interface of the user device (100) such as is shown in FIG. 13, or may place the user device (100) within a configured proximity of the facility control panel (204), which may sense the proximity of the user device (100) using a technology such as RFID, Bluetooth, NFC, or Wi-Fi, and may automatically enable and allow access to the facility (516). Automatic entry may include, for example, a hands free access by displaying a QR code, barcode, or other unique visual identifier on the user device (100) that may then be scanned or read by an access device (204) such as a scanner, an NFC chip or other short range wireless communication device on the user device (100) that exchanges information with an access device (204) such as an NFC receiver, Bluetooth receiver, or other wireless communication receiver, or a user interface element (916) such as that shown in FIG. 13 that, when interacted with, may cause the user device (100) to send a signal via a wireless communication that will cause the facility to become accessible. Once the facility has been enabled and made accessible, by a manual or automatic process, the user may enter the facility. In some versions, the facility becomes automatically accessible by a barrier (e.g., door) becoming automatically unlocked. In addition, or in the alternative, the facility may become automatically accessible by the barrier (e.g., door) automatically opening. Various suitable components that may be used to automatically unlock and/or open a barrier will be apparent to those of ordinary skill in the art in view of the teachings herein.

Figure 6:
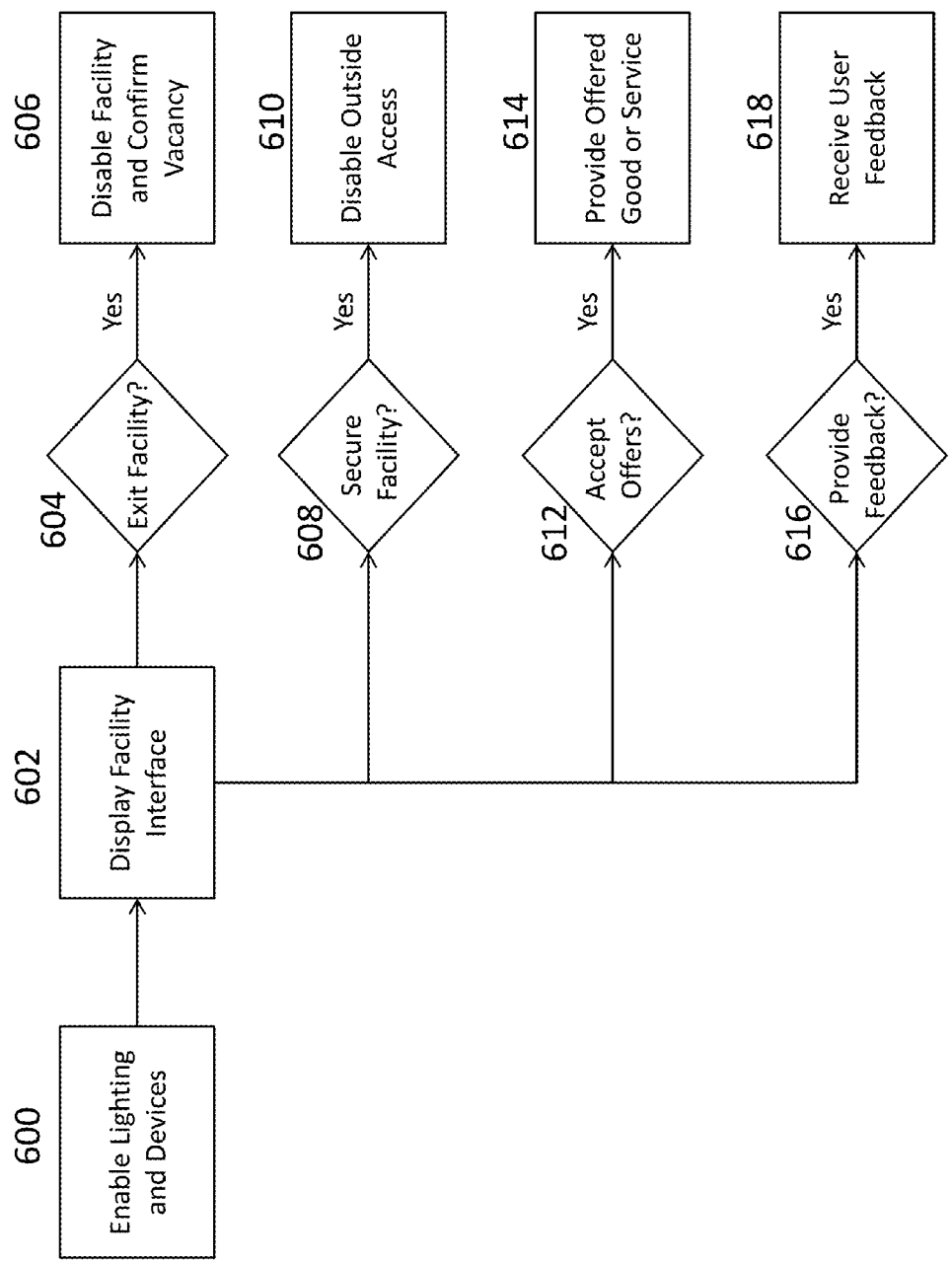
FIG. 6 is a flowchart of a set of steps that a system could perform to allow a user to interact with a facility.

Turning now to FIG. 6, that figure shows a flowchart of a more detailed set of steps that a system could perform to allow a user to interact with a facility (306). As a use enters, a motion sensor (208) may detect their presence enable lighting (600) and any other devices that are not configured to be enabled when the facility is first accessed. Entering the facility may also cause the user device (100) to display a facility interface (602), such as the ones shown in FIGS. 14-16, where the user may interact with various features of the facility and provide feedback and notifications of the quality and usability of the facility. Facility interaction features available in some facilities may include automated exiting of the facility (604), automated securing of the facility during use (608), accepting offers or promotions (612), providing feedback (616), as well as automated controls for devices within the facility such as volume controls for audio and video devices and similar functionality.

If a user chooses to exit the facility (604), a communication may be generated from the user device (100) and communicated to the cloud control platform (110) and then to access control (210), or alternately, from the user device (100) directly to a facility device (212) or access control (210) via Bluetooth, NFC, or another communication. When a user chooses to exit the facility (604), a number of actions may be triggered (606), such as unlatching of the door lock (202), activating of the door opener (200), disabling of lights and devices (216), monitoring via the motion detector (208) to confirm vacancy, latching the door lock (202) to secure the facility, and a notification to both the vendor, via the facility devices (212), and the next user in the queue that the facility is now available. If a user chooses to secure the facility (608) while inside, the automatic lock (202) may latch to secure the facility door (206), and a signal light may activate to let those outside the facility that it is in use.

While inside the facility, certain offers may be available via video or audio devices offering products and services, or via a wall unit or kiosk offering promotional products and samples. If a user chooses to accept an offer (612), the user may, via a user device (100) or via direct interaction with a kiosk or wall unit, receive a product, product sample, or service. For example, a kiosk or wall mounted unit might dispense a hand sanitizer, mouthwash, chewing gum, food, cleaning supply, pain reliever, drink, coupon or voucher for services, or other such item when interacted with directly or via the user device (100). Accepting (612) and receiving (614) an offer might result in a user's information being shared with a vendor, partner, or other third party, with notice of such information sharing being provided during acceptance of the offer or during registration with the system. Other device interactions might include muting an audio or video device, causing an audio or video device to change the currently presented material, accepting an offer or requesting more information on the material presented by an audio or video device, changing the temperature of air conditioning or heating, turning a vacuum cleaner on or off, configuring spray options for a manual or automatic car wash, or other similar interactions where a user may want to activate, deactivate, or modify the characteristics of a device available within the facility.

While using the facility, or upon exiting the facility, a user may choose to provide feedback (616) via an interface such as that shown in FIG. 16. Provided feedback is received by the system (618), and shared with facility maintenance providers and system administrators in order to address issues in maintenance, service, cleanliness, and general user satisfaction. While in some embodiments such feedback may only be available to facility owners and system administrators, received feedback (618) may also be aggregated and provided to other users via one or more interfaces to aid in their choice of a facility. Other facility interactions may occur, depending upon the particular facility and installation environment as well as the configured devices and features.

Figure 7:
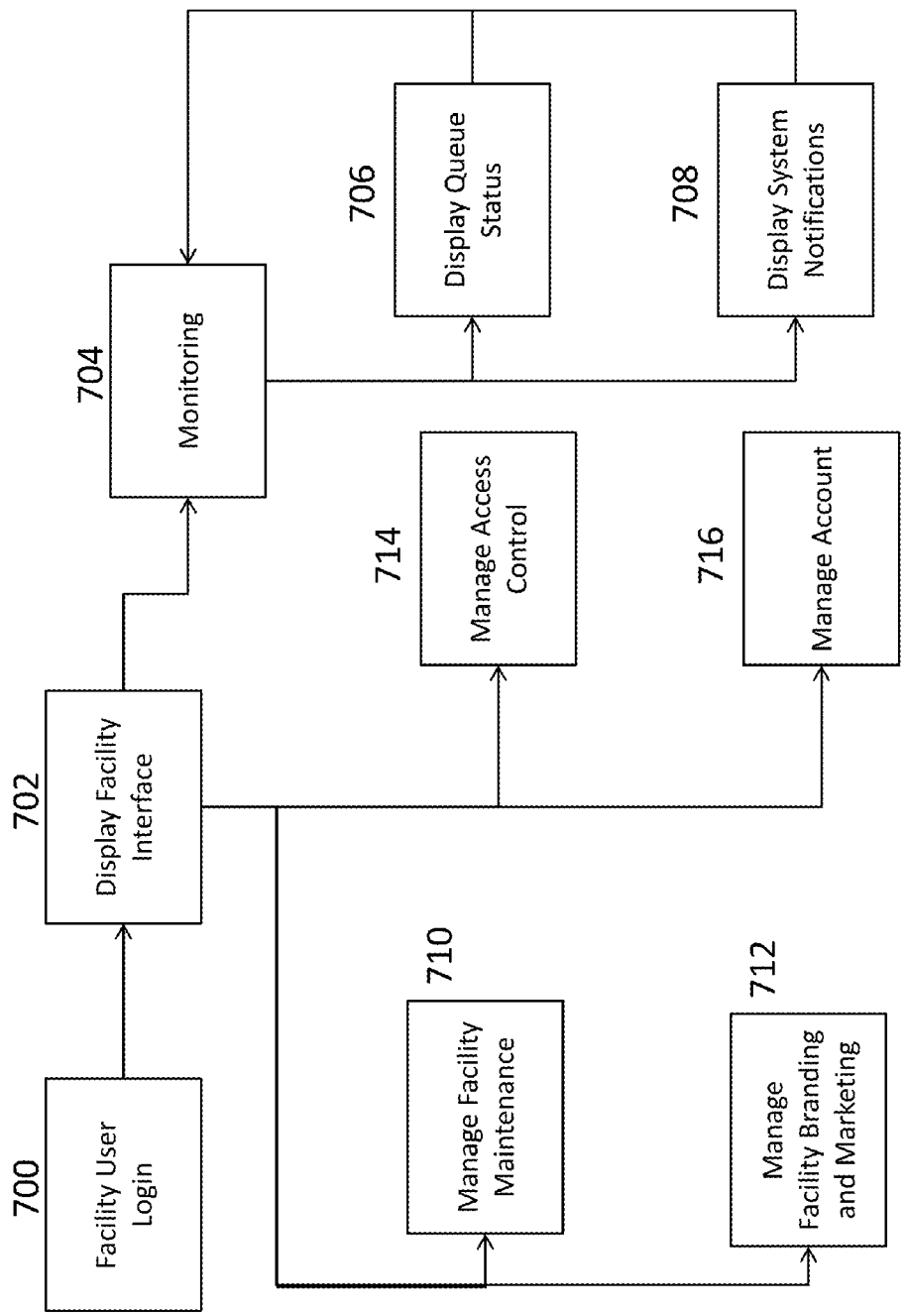
FIG. 7 is a flowchart of a set of steps that a system could perform to allow a facility owner to manage aspects of the disclosed system.

Turning now to FIG. 7, that figure shows a flowchart of a set of steps that a system could perform to allow a facility owner to manage aspects of the disclosed system via one or more facility devices (212). Facility devices (212) may be protected by a facility user login (700) and authentication process to verify that a facility user is authorized by the cloud control platform (110) to manage a facility. Once a user has been authorized (700) as a facility user, a facility management interface may be displayed (702) via the facility device (212). The facility management may perform ongoing monitoring (704) of communications received from access control (210) and the cloud control platform (110). For example, as the facility queue is updated by users checking in, accessing, and exiting the facility, a queue status may be displayed (706) showing how many users are in queue, whether the facility is currently in use, or estimating arrival times for users traveling towards the location. The cloud control platform may also generate communications concerning maintenance, technical issues, or service issues which may be displayed as system notifications via the facility devices (212). For example, if user feedback indicates that a device or fixture within the facility is broken, or that a cleaning check or supply check is due, a notification may be generated by the cloud control platform (110) and delivered to the facility devices (212) so that it can be addressed on site. Device configuration, software, and other settings may also need to be changed on site, and displayed notifications (708) could provide instructions to vendor employees to perform tasks to aid this process. Service alerts and news may also be delivered via displayed notifications (708), such as warnings of abuses of the system or service, guidance on interacting with users, and other helpful information that needs to be distributed and acknowledged by facility employees and owners.

In addition to monitoring (704), the facility interface may also be used to perform a variety of system management functions applicable to a particular facility, or set of facilities. For example, management of the facilities maintenance needs and tasks (710) can be performed via the facility interface. The facility device (212) may be enabled for image capture, allowing images that verify a recently performed maintenance task or verify damage that a user caused to a facility to be submitted via facility maintenance management (710). Maintenance checklists may be viewed and managed via the facility device (212), and may guide cleaners through the required tasks, requesting an image be provided at each step. Training videos may be viewable showing proper maintenance and cleaning procedures. Maintenance and cleaning FAQ's may be provided and viewable, to assist with necessary tasks. Maintenance tickets may also be created, managed, and submitted to the cloud control platform (110) when maintenance needs are beyond that provided by the facility host, such as severely damaged fixtures that need replacement. In versions where the facility device (212) receives identifying information for the facility worker who is completing the maintenance checklist (e.g., through a user log on routine, etc.), the system may automatically search for and detect trends in negative user ratings of the facility (as described above) and use such trends as a basis for flagging a facility worker with an unusually high association between their facility maintenance routines and negative user ratings. In other words, the system can detect facility workers who do not seem to faithfully observe the maintenance checklist, based on trends in user review data. The facility operator may use this information to take appropriate action with such facility workers.

A tool for management of facility branding and marketing (712) may also be provided and accessible from the facility interface. Branding tasks performed through such a tool may include downloading, configuring, and approving branding images, text, and other media from the cloud control platform (110) to be displayed on facility devices (212) and distributed to user devices (100), as well as controlling system messaging for when a facility is out of order or experiencing high occupancy. Marketing tasks performed through such a tool may include downloading, configuring and approving marketing text, images, and other media from the cloud control platform (110) to be displayed on facility devices (212) and distributed to user devices (100). Marketing tasks may also include configuring special offers of vendor goods and services available for pre-order or acceptance at a location while visiting a facility, and configuration of partner marketing to cross promote vendors, for example, when products and services are complementary and non-competing, in order to drive business between vendors that host facilities and provide additional incentives to participate in the system.

Facility devices (212) may be implemented with additional features. One such additional feature might be to allow a facility worker to use the facility device (212) to manually manage the queue for that facility. This could include, in addition to manually adding a person to the queue (512) as described above, removing users from the queue or reordering the queue. Manual removal and reordering could be useful to allow facility staff to address abuse of the system or intentional manipulation of the queue, allowing users to jump to the front of the queue in case of an emergency, or allowing a user to leave the location briefly and return to use the facility at a later time. When a person is removed from the queue they may receive a notification via their user device (100) as well as a brief explanation for the reason of their removal. When the queue is reordered, all users in the queue may receive a notification and brief explanation via their user devices (100). Such features may additionally have audit tracking of their use, which could include identifying a user of the facility device (212) by an employee identifier or user facing a camera at the time that the feature is used, or by requiring a challenge code or password that is unique to each facility staff member. If audit information indicates an unusually high level of queue manipulation by a particular facility staff member, system administrators or facility managers may be notified of the user and audit information that appears to be irregular, so that any abuse of queue reordering features can be addressed.

In addition to allowing manual queue management via a facility device (212), some versions of the disclosed technology may allow queue management by two or more end-users via user devices. In this manner, the order of users within the queue may be dynamically rearranged based on events and interactions between the two or more end-users. In some such versions, administrators or staff of a private facility could delegate part or all of the organization of the queue to end-users and reduce the burden of manual line management activities on the facility staff or administrators. For an example of how such features may be implemented, if a user within the queue requests high priority access to a facility or resource, a notification or message may be sent from that user to all other users ahead of that user in the queue via their user devices, requesting that the receiving users either exchange places in line with the requesting user, or otherwise move behind the requesting user in the queue so that the requesting user may access the facility or resource as soon as possible. Such a message or notification may be in the form of a standard and non-configurable message describing a generic emergency or need for high priority access; or might allow for partially or completely user configured message content that could be sent to other users while maintaining each user's individual anonymity.

Operating in this manner, user collaborative queue management can allow two or more end-users to replicate via the disclosed technology the highly contextual interpersonal interactions that occur when members of a physical queue offer someone else their spot in line, perhaps because they have small children, or are only purchasing a few items, or otherwise seem to be in a hurry. Such user collaborative queue management could be paired with features allowing a user who sacrifices their position in line to receive some reward or incentive for doing so, and could include, for example, the purchase of goods (e.g. a coupon or voucher for coffee or food item) for the sacrificing user, a monetary donation to the sacrificing user, or a virtual currency or virtual point grant to the sacrificing user.

Another feature available via the facility device (212) may be to take a facility offline, in case the location in which the facility is located is closed for any reason, or in case there is maintenance needed for the facility before it can be used, or for any other reason in which a location, such as a restaurant or coffee shop, might want to temporarily disable use of their facility by users of the system. When facility device (212) is used to disable a facility, any users queued for that facility may receive a notification via their user device (100) that the facility is no longer available, and may be given the option to be queued at a nearby location in a manner that will preserve their current estimated wait time as closely as possible.

Another feature available via the facility device (212) may be to flag one or more users as being related to an incidence of damage or vandalism to a facility. For example, where a user of the facility reports graffiti, unreasonable damage, or intentional damage to a facility, a facility staff may use the facility device (212) to report the damage and flag one or more users of the facility that might be responsible. This could be the most recent user before the reporting user, the most recent five users, every user in the past 12 hours, or another desired block of users. The user report may be submitted along with digital images of the vandalism or damage. Flagged users and associated images may be stored in the cloud control platform (110) and may be analyzed over time, such that if a user is identified on several occasions as being a recent user of a facility that was damaged or vandalized, or if images of the vandalism or damage show similar damage on two occasions in which one user is present for both, that user may have their membership in the program revoked to prevent further facility access.

A tool for managing access control (714) may also be provided and accessible from the facility interface. Tasks performed through the access control (714) tool may include temporarily changing the private facility into a public mode, whereby it would remain accessible for any user, unlocking, opening, and enabling the devices of a facility for a one time use, activating a card or device granting a limited number of uses or a limited time period of use, and other tasks that may allow the facility employees to maintain normal control over the access of the facility to address situations that may arise. This could be useful where a consumer of the vendor who is not a member of the service needs access to the facility, or where technical difficulties with a user device (100) or other device are preventing normal entry methods from working. A tool for managing a facility account (716) may also be provided via the facility interface, allowing a facility user to enable or disable the service, configure facility specific options, configure options to increase or decrease the rate at which they appear in user searches, and other facility level changes.

Figure 8:
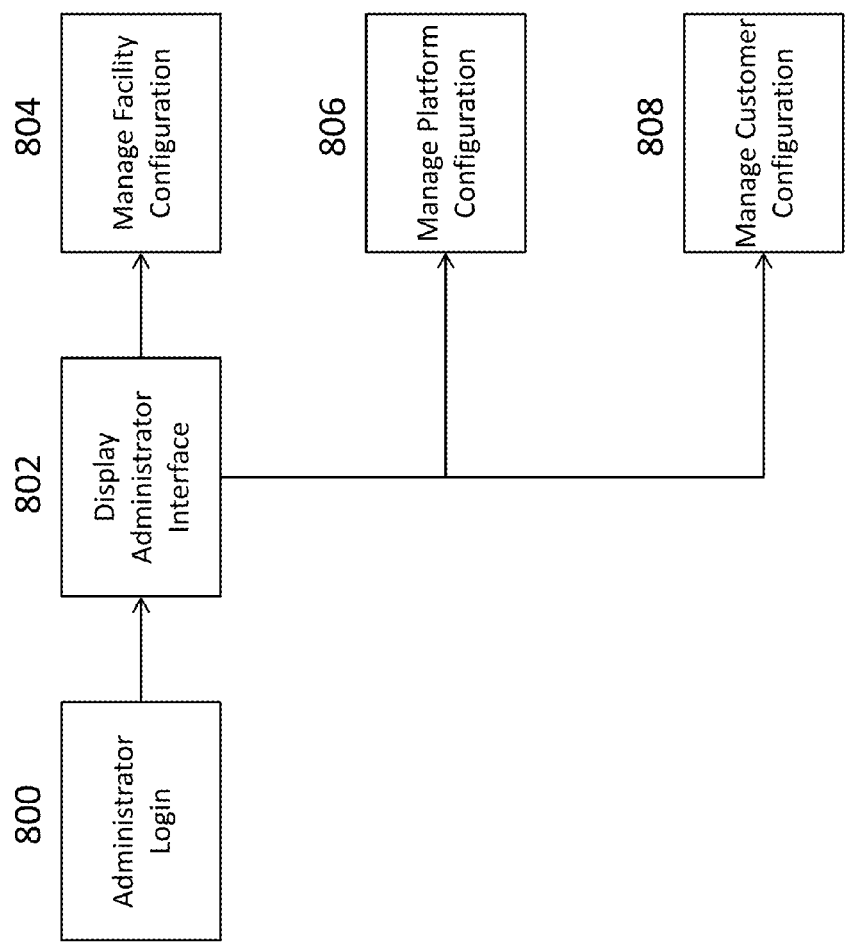
FIG. 8 is a flowchart of a set of steps that a system could perform to allow a system administrator to manage aspects of the disclosed system.

Turning now to FIG. 8, that figure shows a flowchart of a set of steps that a system could perform to allow a system administrator to manage aspects of the disclosed system via the cloud computing platform (110). Administrator level management is controlled by a login (800) and authentication process. Once authorized, an administrator interface may be displayed (802) for an administrator user, allowing the user to manage facility configurations (804), manage platform configurations (806), and manage customer configurations (808). A tool for managing facility configuration (804) may include tools for managing the software and database configuration of new facilities, removing facilities, modifying facilities, adding, removing, and modifying devices at a particular facility, generating and distributing communications to one or more facilities, monitoring and generating alerts for one or more facilities, viewing aggregated records of completed and pending maintenance tasks for one or more facilities, and viewing the status of queues at one or more facilities.

A tool for managing platform configuration (806) may include tools for configuring pricing plans, configuring and managing various user roles, such as facility employee, facility manager, facility owner, mobile user, and others, and managing credentials and permission levels for various users and user roles so that functionality within the system can be exposed or limited as needed, managing high level queue configurations such as time estimates per person in queue, queue thresholds for refusing additional users entry, facility entry time outs, and other high level configurations that may be applied to facilities by city or region, configuration of event monitoring to control what events are delivered to users and facilities as notifications, and workflow configuration for tasks performed by administrators and facility personnel.

A tool for managing customer configuration (808) may include tools for creating, modifying, and removing customer accounts and information, creating and modifying customer subscription plans for users and facility users, and managing, processing, and reviewing payments by users, facility users, marketing partners, and others consuming or contributing goods, services, and other components to the system.

While some of the techniques discussed above may require or benefit from a mobile data technology such as 3G or 4G wireless data transmission, it should be understood that the technology and processes can also be performed by a user device that is "offline" or that can only access online resources via a Wi-Fi hotspot with some slight modifications. This could be useful for situations where a user is a visitor from another region or country and may not have reliable or usable mobile data capabilities within the area they are visiting. In such a situation, an offline mode may be enabled where the mobile service (102) will provide a set of offline data to the user device (100) for one or more cities, states, or regions. The set of offline data may be a file or series of files that contain information that will allow the user device (100) to search for and identify facilities, as shown in FIGS. 10-11, without requiring any exchange of data between the cloud control platform (110) and the user device (100) beyond the transmission of the set of offline data. Depending upon the capabilities of the user device (100), the user experience may be very similar to the normal user experience, but may lack real time information from the cloud control platform (110) such as current queue depth (906). For instance, in an "offline" mode, the user device (100) may show the user the locations of associated facilities on a map, but not show real-time information such as the number of other users that are already currently in the queue for each facility on the map.

When in "offline" mode, the user device (100) may determine based upon GPS coordinates, if available for that user device (100) without a data connection, or based upon a user input, when the user has arrived at the facility. Upon arrival, the user device (100) may prompt the user to connect to a local facility Wi-Fi connection, which may then allow the user device (100) to complete check in (408) and reserve a queue position (410), as well as receive updates (506) on queue status and other features that may not be available in "offline" mode without the local Wi-Fi connection.

III. Exemplary Methods for Pre-Authorizing Access to a Secured Location

Figure 17:
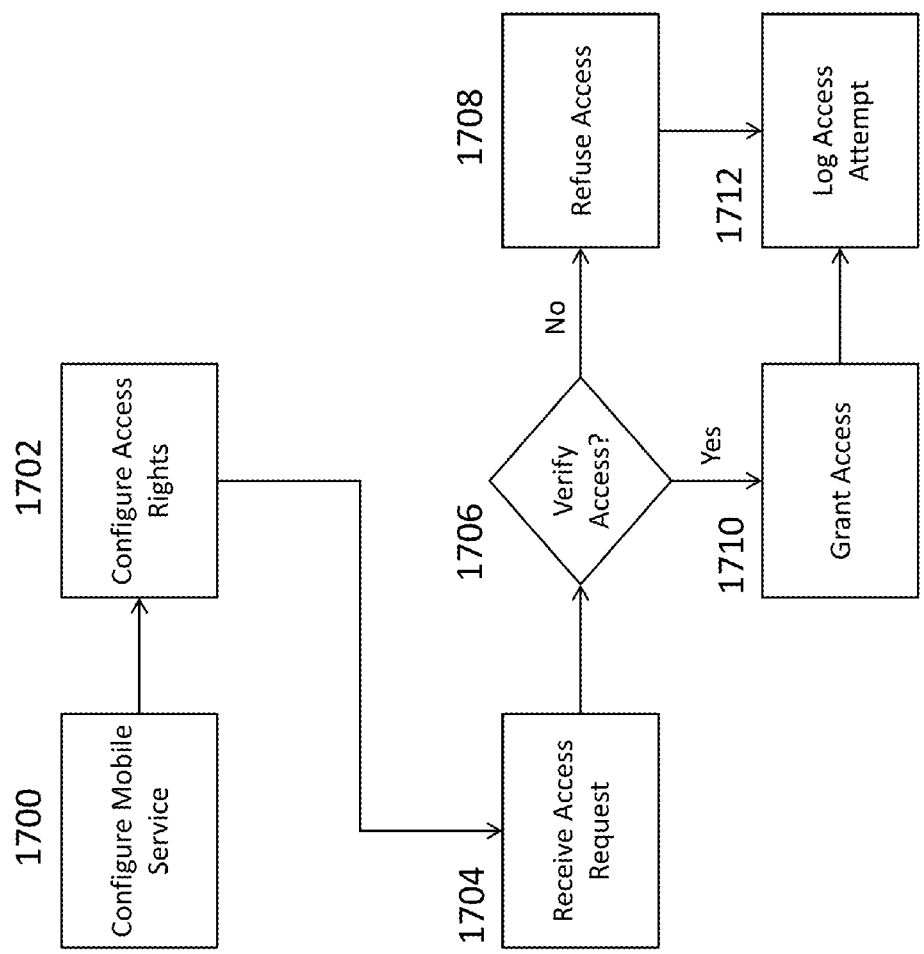
FIG. 17 is a flowchart showing an example of a set of steps that could be performed to provide employee access to a secured area.

The configuration of devices shown in FIG. 2 may be used in other access control situations with some modifications. For example, FIG. 17 shows a set of steps that could be performed by a system such as that shown in FIG. 2. In such an embodiment, the facility door (206) may be a room entry door, a storage closet door, a storage locker or chest door, or a similar access controlled compartment, room, or device. This configuration could be useful to allow an authorized user to access a secured room or storage, such as an employee accessing a secured storage room or break room, a restaurant manager accessing a secured manager's office, or a doctor or nurse accessing a pharmaceutical storage area.

Initially, the employee or other party that is to be granted access may configure a device, such as a smart phone, tablet, or other personal electronic device (100) to access or execute the mobile service (102). This configured device (100) may be the individual's personal device or may be a device provided by the employer or administrator of the secured area. Configuration of the mobile service (1700) may also include registration of the user with the mobile service (102), configuration of additional passwords or security challenges to access the mobile service (102), and creation of user accounts and records on a server (214). An employer or administrator may also configure access rights (1702) for the recently created or configured user. Configuration of access rights could include granting the user account access to one or more secured locations, configuring times, days, or other situations in which access may be conditionally granted to one or more locations, configuring whether requests for access from the user must be reviewed before access is granted, configuring the maximum number of times that access may be granted each day, week, month, or other time period, and other such limitations.

With a properly configured user device (100), a user may request access to a secured location by interacting with an access panel (204) via an optical identifier such as a QR code or barcode presented via the display of a user device (100), transmitting a Bluetooth, Wi-Fi, infrared, or other wireless signal, by selecting the location from an interface of the user device (100), or another method of indicating access to a particular location that is controlled by the system. This access request is received (1704) by the system and the requested access is verified (1706), which could include verifying that the configured access rights authorize the user for access to the particular location; and that no other conditional restrictions apply, such as time or date restrictions.

If the user is not authorized for the location under any conditions or under the particular conditions of that request (1706), the system will refuse access (1708) to the requester and the secured compartment or room will remain locked and inaccessible. The system may additionally log the access attempt (1712), which may include creating a record of the request, including the requesting user, whether the request was granted, what conditions the request was made under, GPS location data from the user device (100) from which the request originated, and/or camera images, video, and audio from a camera located proximate to the access panel (204) or the secured area (206), which may provide visual documentation of the requester's presence. If the requested access can be verified (1706), such as where, under the access rights, the user is granted unconditional access to the location or is not in violation of any conditional access rights, the system may grant access (1710) to the requester by unlocking, opening, or enabling the secured area or device for a period of time. Even when the access request is granted (1710), the system may log (1712) information and images relating to the access attempt to allow for later analysis.

IV. Exemplary Method for Managing Visitor and Guest Access

Figure 18:
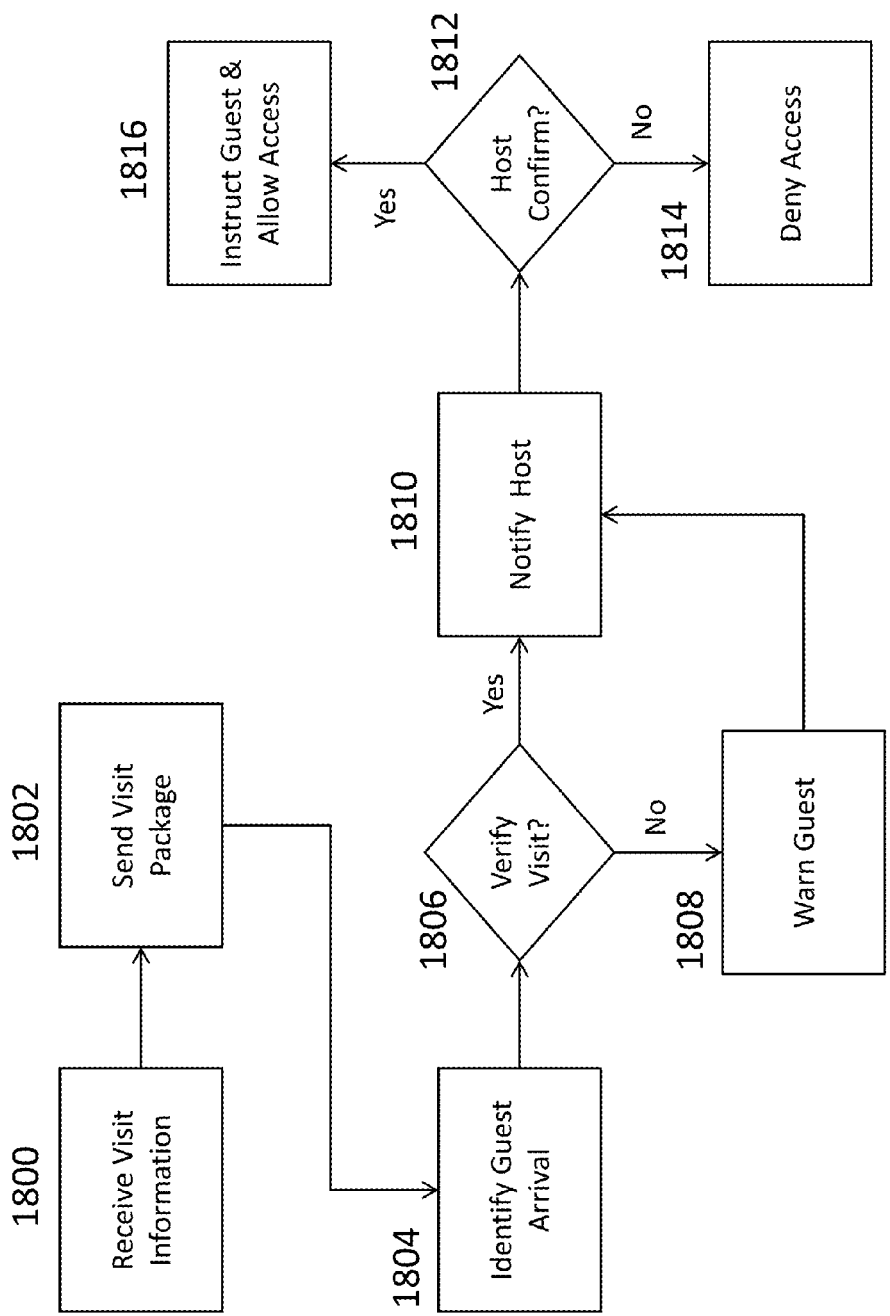
FIG. 18 is a flowchart showing an example of a set of steps that could be performed to provide scheduled visitor access to a secured area.

FIG. 18 shows an alternate embodiment of set of steps that could be performed by a system such as that shown in FIG. 2. In such an embodiment, the facility door (206) may be an elevator, a security turnstile or door, or another access point to a private business. FIG. 18 shows a set of exemplary steps that could be performed to allow a guest or visitor to access the private business. Initially, the system will receive visit information (1800) that includes the identity and contact information for a person that will visit the private business, as well as the time and date of the visit, information that may commonly be available in an electronic calendar entry or electronic email invitation. To the extent that the visitor is only invited to visit a particular area of the private business, the visit information may indicate the limited area associated with the visitor.

The system may generate and transmit a visit package (1802) to the visitor via an email address, telephone number, and/or other point of contact. The visit package may include typical information that would be present in a meeting or appointment confirmation, but may also include data that may be used to interface with the secure access system of FIG. 2. The additional data may be an attached application or a link to an application that will allow the user to configure a user device (100) to access or execute the mobile service (102), a visual identifier such as a QR code or barcode, or unique key data that could be transmitted via NFC, Bluetooth, Wi-Fi, or other wireless signal to provide a unique identifier of the user that is requesting access. The additional information contained in the visit package may be installed or retained on the user device (100) of the visitor until the time of the appointment.

When the date and time of the appointment nears, the visitor may proceed to the location of the private business. For embodiments that allow the visitor to install an application for the mobile service (102), the application may provide additional features such as GPS guidance to the private business, parking suggestions or information, traffic warnings and rerouting information, changes to the appointment time and location. The system may also provide information to administrators at the private business such as the visitor's estimated arrival time, indications that the user may be late or may need to reschedule, and similar information, based on GPS data from the visitor's user device (100).

When the visitor arrives at the private business location, the system may identify the arrival of the visitor (1804) based upon GPS information from the user device (100), or RFID, Wi-Fi, Bluetooth, NFC, or other limited range wireless connection or beacon detection. As another example, the private business may have an optical reader that scans a QR code or other optical code on the visitor's user device (100), with the QR code or other optical code having been sent to the visitor as part of the visit package (1802) referred to above. After arrival (1804), the visit may be verified (1806) to ensure that the user or visitor has arrived within a date and time window that they have received an invitation for from the private business. If the visit cannot be verified, the system may warn the visitor (1808) that they are not scheduled to visit the private business that day, and that they may wish to leave and return at their scheduled time or contact the host that invited them to reschedule.

Whether the visitor is verified or not (1806), the system will notify the host (1810) of the visitor's arrival, any appointments that the visitor is associated with, whether the visitor was verified or not; and may additionally provide images, audio, or video from a camera or other device proximate to the lobby or waiting area at which the visitor is waiting. The host may review the host notification (1810) and decide to grant or deny (1812) the visitor access to the private business. If the system receives an indication from the host that the visitor has been denied access (1814) for any reason, the facility door (206) will remain locked and the visitor may receive a notification via the user device (100) that access has been denied, as well as an indication for why access was denied and contact information for a host or other administrator of the private business. If access is granted (1816), the system may provide a notification to the visitor indicating that they should proceed to a certain door, elevator, or office, and unlock and open a door or send an elevator to allow the visitor access to the private business. After granting access (1816), the system may continue to track the location of the visitor based on GPS data from the visitor's user device (100), using beacons located within the private business, and/or using other techniques, to ensure that the visitor stays within areas commensurate with the scope of the visitor's invitation. In the event that the system detects that the visitor has traveled to an area of the private business that is outside of the scope of the visitor's invitation, the business may provide a warning to the visitor (e.g., via an automated phone call, an automated text message, etc.) and/or provide notification to personnel associated with the private business.

The system described in FIG. 18 could be useful for visitors coming to a private business for job interviews, business negotiations or presentations, tours, providing services or repairs, or other similar reasons where a visitor may be granted controlled, one-time access to a private business. The system provides utility to both visitor and host by allowing each party to determine the status of the other, such as whether a party is running late or needs to reschedule, without the necessity of constant contact via phone or email.

V. System and Method for Managing Parking Facility Access

Figure 19:
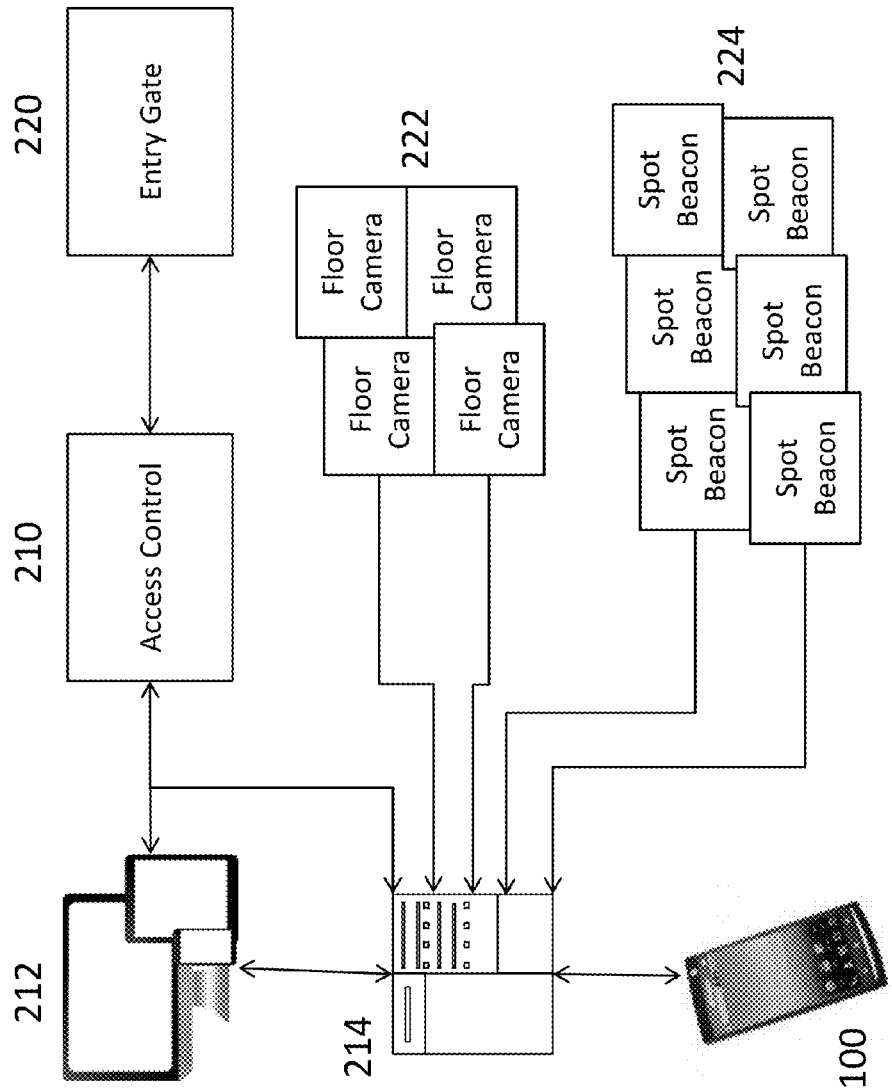
FIG. 19 is a schematic diagram showing an exemplary configuration of devices for managing access to a parking facility.

FIG. 19 shows an exemplary alternate configuration of devices that may be used to control access to a secured parking facility. Similar to the system shown in FIG. 2, the system of FIG. 19 additionally may have one or more entry gates (220) that are automated to open or close to allow or prevent entry into the parking facility in response to a signal received from the access control device (210). Additionally, the parking facility may have one or more of a set of floor cameras (222) and/or a set of spot beacons (224). Cameras (222) and/or beacons (224) may be used to monitor availability of parking spots within the parking facility as will be described in greater detail below. In addition, or in the alternative, cameras (222) and/or beacons (224) may be used to monitor the location of user vehicles within the parking facility as will also be described in greater detail below.

The set of floor cameras (222) may be spread across the parking facility and focused so that a number of parking spots are within the field of view of each camera of the set of floor cameras (222). Image and video data captured by the set of floor cameras (222) is received by the server (214) and used to generate and maintain parking spot availability lists. For example, if a single camera has 10 spots within its field of view, the server (214) may be configured to compare current sets of imaging data generated by the camera to sets of imaging data generated when the spots were vacant. By detecting the difference in the resulting image and comparing to a vacant spot, the server (214) is able to determine if the parking spot is vacant or not. In some versions, floor cameras (222) may be used to determine the vacancy of parking spots on a granular basis, such that the server (214) can specifically identify individual parking spots as being vacant or not. In some other versions, floor cameras (222) may be used to determine general vacancy of parking spots without necessarily achieving granularity. In some such versions, the server (214) can identify specific floors or other sub-regions within a parking facility that have greater vacancy than others, without necessarily specifically identifying individual parking spots as being vacant or not.

Figure 20:
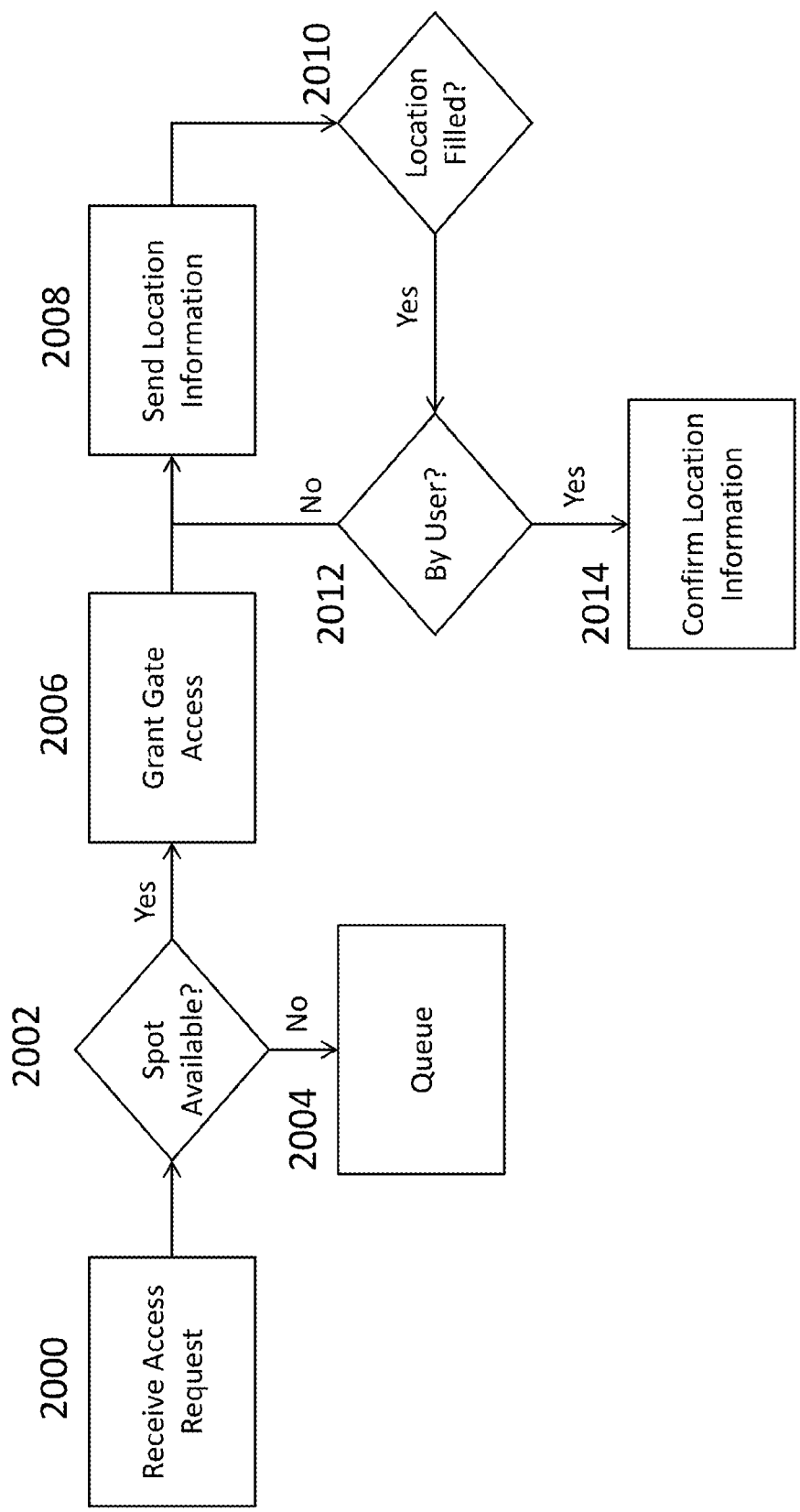
FIG. 20 is a flowchart showing an example of a set of steps that could be performed to allow a visitor to enter a parking facility.

The set of spot beacons (224) may provide a similar functionality of determining whether a spot is vacant or not, and in some cases determining if a person having a user device (100) is proximate to a parking spot. A spot beacon (224) may have one or more sensors or functionalities such as a photo eye, laser break beam sensor, weight sensor, motion sensor, audio sensor, radar, and/or other sensor that may detect the presence or absence of physical characteristics of the surrounding area. The set of spot beacons (224) may be deployed around the parking facility such that each spot beacon detects characteristics of one or more individual parking spots. Data generated from the set of spot beacons (224) is reported to the server (214) and used to maintain a list of parking spots and whether they are vacant or not. Configured in this manner, server (214) may use one or more of the above described technologies to determine at any given time a set of vacant parking spots and a set of filled parking spots. While the foregoing example provides a capability of specifically identifying individual parking spots as being vacant or not based on data from spot beacons (224), not all versions will necessarily have to provide such granularity of information. For instance, as noted above with respect to data from cameras (222), some versions of the system may only identify specific floors or other sub-regions within a parking facility that have greater vacancy than others based on data from spot beacons (224), without necessarily specifically identifying individual parking spots as being vacant or not FIG. 20 shows an example of a set of steps that a system, such as that shown in FIG. 19, could perform to allow automated entry and exit to a secured parking facility. The user device (100) may transmit a request for entry to the parking facility via the mobile service (102)—either from a location remote to the parking facility, so that access can be requested from the facility before arrival. For instance, the user may transmit the request via a smartphone application installed on the user device (100), via a website, or in some other fashion, from a location that is in, near, or remote from the parking facility. Alternatively, the user device (100) may transmit the request for entry at the gate (220). As with other disclosed methods, this could be accomplished via a mobile data connection through server (214); or by an optical or wireless data exchange such as QR code, Bluetooth, Wi-Fi, NFC, or similar technologies. Once the system receives the access request (2000), the system then queries a constantly maintained list of vacant parking spots to determine if there is a vacant parking spot available (2002).

If there is no vacant parking spot available (2002), the user request may be placed into a queue (2004) so that they may be notified if a vacant spot becomes available. If there is a vacant spot, the system will grant access (2006) to the user through the entry gate (220). By way of example only, in some versions the user may present a QR code or other code to an optical reader provided through access panel (204) at the gate (220). Alternatively, the user may place their user device (100) next to an NFC reader provided through access panel (204) at the gate (220), such that the reader can read an NFC chip installed in the user device (100). As another merely illustrative alternative, the system may detect the presence of the user at the gate (220) based on geolocation information. Such geolocation information may be obtained using data from the GPS of the user device (100), using data from beacons (224) within the parking facility, using cameras (222) within the parking facility, and/or using other hardware, etc. As yet another merely illustrative alternative, the user may request access via the mobile service (102) or otherwise indicate that they are present at entry gate (220) and ready to enter the parking facility.

After the user enters the parking facility via the entry gate (220), the system may send location information (2008) to the user indicating a floor, a specific parking spot, or both that the user should proceed to in order to park their vehicle. It should be understood that the level of granularity in the location information (2008) (e.g., specific individual parking spot, specific floor of the parking facility, general zone within the parking facility, etc.) may be dependent on the data resolution obtainable through cameras (222) and/or beacons (224) as noted above.

In versions where the system has a data granularity permitting identification of specific individual parking spots, after sending the location information (2008), the system may update the list of vacant spots maintained on server (214) so that the spot recommended in the location information (2008) may be considered filled for a period of time, to give the user time to find and park in the spot before it is reassigned. Thus, to the extent that the system recommends a particular parking spot for a user, the system will refrain from recommending the same particular parking spot for a subsequent user, at least until the system confirms that the first user has either chosen a different parking spot or is otherwise not using that particular recommended parking spot as described below.

If, after assigning a parking spot via the location information (2008), the system determines that the assigned location has been filled (2010) via information received from a camera (222) or beacon (224), the system will determine if the location was filled by the user to whom it was assigned (2012). This may be determined by, for example, transmitting an inquiry to the user when it is determined that the location was filled (2010), and receiving confirmation back from the user; or by detecting a unique signature of the user device (100) via a beacon (224); or by similar means. If the location is filled (2010) by someone other than the user, the system will send a new set of location information (2008) indicating to the user a subsequent vacant spot that may be parked in.

If the location is filled by the requesting user (2012), the system will send a set of location confirmation information to the user via the user device (100) which indicates to the user the floor and spot that they are parked in, the street address of the parking facility, and may additionally provide a captured image of the parking spot taken from a camera (222) if available, to aid the user in later visually identifying the area in which they parked. At this point, the user is free to carry about their business in the area of the parking facility without having to carry a parking stub or ticket or memorize the address and floor on which they parked. The mobile service (102) may provide additional functionality, such as one touch functionality to enable GPS and guide the user back to the facility in which they parked.

Figure 21:
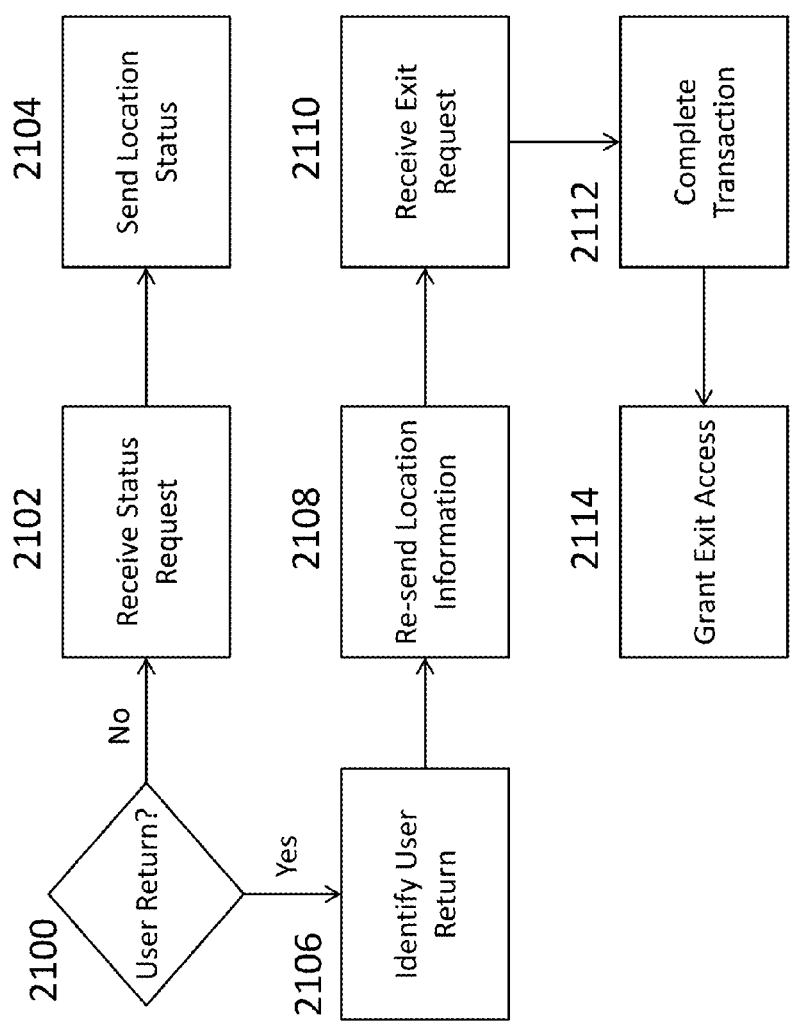
FIG. 21 is a flowchart showing an example of a set of steps that could be performed to allow a visitor to exit a parking facility.

FIG. 21 shows an example of a set of steps that a system (e.g., the system of FIG. 19) could perform to guide a user back to their parking spot and allow them to exit the parking facility. Before a user returns to the facility (2100), the user may send a status request to the system via the user device (100). When received by the system (2102), the system will send back to the user a location status update (2104) which may include the floor and spot in which they parked, address of the facility, time at which they parked, and provide a current image of their vehicle from the camera (222) where available. When the user has returned to the parking facility (2100), either guided by GPS guidance provided by the mobile service (102) via the user device (100) or by returning there unaided, the system will identify the user (2106) via GPS information provided by the user device (100), by an indication from the user via the mobile service (102) that they have returned to the facility, or by a connection indicating the user's proximity via Wi-Fi, Bluetooth, RFID, or other wireless transmission with a receiver of such transmission located at the parking facility.

When the system identifies that the user has returned (2106), the system will re-send location information (2108) identifying the floor and spot in which the user has parked. This will aid the user in locating and returning to their vehicle. After the user returns their vehicle to the gate (220) of the facility, the system may receive an exit request from the user device (2110), causing the system to complete the parking transaction (2112). The system may receive the exit request from the user device (2110) in a variety of different ways. For instance, the user may present a QR code or other code to an optical reader provided through access panel (204) at the gate (220). Alternatively, the user may place their user device (100) next to an NFC reader provided through access panel (204) at the gate (220), such that the reader can read an NFC chip installed in the user device (100). As another merely illustrative alternative, the system may detect the presence of the user at the gate (220) based on geolocation information. Such geolocation information may be obtained using data from the GPS of the user device (100), using data from beacons (224) within the parking facility, using cameras (222) within the parking facility, and/or using other hardware, etc.

Completing the transaction (2112) may include charging the user's previously configured credit card or account for the cost of parking, or applying the parked time against a prepaid credit or subscription for parking services. After the system completes the transaction (2112), the exit gate (220) is opened allowing the user to exit the parking facility.

Those of ordinary skill in the art will recognize that some parking facilities may be located at least partially underground and/or underneath large buildings (e.g., skyscrapers), such that it may be difficult for a user device (100) in the parking facility to receive a reliable signal from a cellular tower. To the extent that there are difficulties establishing connectivity between the user device (100) and the server (214) in some parking facilities, this may be overcome by, for example, signal boosting equipment; or broadly distributed secure Wi-Fi signal connectivity throughout the parking facility, which a user device (100) may automatically connect to by way of the mobile service (102). Alternatively, any other suitable hardware configurations and/or techniques may be used to provide connectivity between the user device (100) and the server (214) in parking facilities where standard cellular data service may otherwise be difficult to achieve.

VI. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An apparatus comprising: (a) an access control device, wherein the access control device is configured to be communicatively coupled with an automatic locking mechanism providing selective access through an entryway at a private facility; (b) a server configured to store a facility queue, wherein the server is communicatively coupled with the access control device; and (c) a user interface operable to provide a set of instructions that may be executed by a processor, wherein the user interface is configured to be installed on a user device; wherein the server is configured to: (i) receive a user selection indicating a user's intent to access the private facility, (ii) add the user to the facility queue, (iii) send a facility notification to an administrator of the private facility, the facility notification comprising an indication that the facility queue has changed, (iv) cause the user interface to display an indicator of the user's position in the facility queue, and (v) cause the user interface to display an indicator that the user is at the front of the facility queue; and wherein the access control device is configured to: (i) receive an electronic signal indicating that the user is attempting to enter the private facility from the user device, and (ii) if the user is at the front of the facility queue, disable the automatic locking mechanism.

Example 2

The apparatus of Example 1, wherein the server is further configured to cause the user interface to display a set of private facilities and, for each of the set of private facilities: (i) a location, relative to the user, and (ii) a distance, relative to the user.

Example 3

The apparatus of Example 1, wherein the server is further configured to add the user to the facility queue in response to receiving an electronic signal indicating that the user has arrived at the private facility.

Example 4

The apparatus of Example 1, wherein the facility notification further comprises a request that a good or a service be made available to the user upon arrival at the private facility.

Example 5

The apparatus of Example 1, wherein the user interface is further configured to, in response to an interaction by the user, cause the user device to emit the electronic signal indicating that the user is attempting to enter the private facility.

Example 6

The apparatus of Example 5, further comprising an automatic door opener in communication with the access control device, wherein the automatic door opener is configured to open the barrier when the automatic locking mechanism is disabled.

Example 7

The apparatus of Example 6, wherein the access control device is further configured to receive an electronic signal indicating that the user is within the private facility and, in response to the electronic signal indicating that the user is within the private facility: (i) cause the automatic door opener to close the barrier, and (ii) enable the automatic locking mechanism.

Example 8

The apparatus of Example 1, wherein the access control device is further configured to receive an electronic signal indicating that the user is within the private facility from the user device and, in response to the electronic signal indicating that the user is within the private facility, activate a secondary device.

Example 9

The apparatus of Example 8, wherein the access control device is further configured to receive a control signal from the user device and, in response to the control signal, modify the operation of the secondary device.

Example 10

The apparatus of Example 1, wherein the access control device is further configured to: (i) receive an electronic signal indicating that the user has exited the private facility, and (ii) in response to receiving the electronic signal indicating that the user has exited the private facility, send a feedback notification to the server; and wherein the server is configured to: (i) in response to receiving the feedback notification, cause the user interface to display a request for feedback, and (ii) receive a feedback response from the user via the user interface.

Example 11

A method comprising the steps of: (a) providing a user interface that may be configured on a user device; (b) receiving, at a server, a user selection indicating a user's intent to access a private facility; (c) adding the user to a facility queue stored on the server; (d) sending a facility notification to an administrator of the private facility, the facility notification comprising an indication that the facility queue has changed; (e) causing the user interface to display an indicator of the user's position in the facility queue; (f) causing the user interface to display an indicator that the user is at the front of the facility queue; (g) receiving, at an access control device from the user device, an electronic signal indicating that the user is attempting to enter the private facility; and (h) if the user at the front of the facility queue, disabling an automatic locking mechanism, wherein the automatic locking mechanism is configured to prevent a barrier from being moved, and wherein the barrier is configured to prevent access to the private facility.

Example 12

The method of Example 11, further comprising the step of causing the user interface to: (i) display a set of private facilities, and (ii) for each of the set of private facilities: (A) a location, relative to the user, and (B) a distance, relative to the user.

Example 13

The method of Example 11, wherein adding the user to the facility queue comprises adding the user to the facility queue in response to receiving an electronic signal indicating that the user has arrived at the private facility.

Example 14

The method of Example 11, wherein the facility notification further comprises a request that a good or service be made available to the user upon arrival at the private facility.

Example 15

The method of Example 11, further comprising the step configuring the user interface to, in response to an interaction by the user, cause the user device to emit the electronic signal indicating that the user is attempting to enter the private facility.

Example 16

The method of Example 15, further comprising the step of causing an automatic door opener to open the barrier when the automatic locking mechanism is disabled.

Example 17

The method of Example 16, further comprising the step of configuring the access control device to: (i) receive an electronic signal indicating that the user is within the private facility, and (ii) in response to the electronic signal indicating that the user is within the private facility: (A) cause the automatic door opener to close the barrier, and (B) enable the automatic locking mechanism.

Example 18

The method of Example 11, further comprising the step of configuring the access control device to: (i) receive an electronic signal indicating that the user is within the private facility from the user device, and (ii) in response to the electronic signal indicating that the user is within the private facility, activating a secondary device.

Example 19

The method of Example 18, further comprising the step of configuring the access control device to: (i) receive a control signal from the user, device and (ii) in response to the control signal, modify the operation of the secondary device.

Example 20

An apparatus comprising: (a) an automatic locking mechanism at a barrier at a private facility; (b) an access control device communicatively coupled with the automatic locking mechanism; (c) a facility control device communicatively coupled with the access control device; (d) a remote server communicatively coupled with the access control device, the remote server comprising a facility queue for each facility; and (e) a user device communicatively coupled with the remote server; wherein the user device is configured to: (i) display a set of information for a plurality of private facilities, the set of information comprising, for each private facility, a location, a distance relative to the user device, and an indication of availability, the indication of availability based upon a quantity of user reservations within the facility queue, and (ii) receive a user selection indicating a desire to access the private facility and send the user selection to the remote server; wherein the remote server is configured to: (A) in response to receiving the user selection from the user device, add a user reservation to the end of the facility queue associated with the private facility, and (B) in response to the user reservation being at the front of the facility queue, generate an alert via the user device indicating that the private facility may be accessed by a user; and wherein the access control device is configured to: (I) in response to receiving an indication that the user associated with the user reservation that is at the top of the facility queue is proximate to the barrier and wishes to enter the private facility, cause the automatic locking mechanism to allow access to the private facility via the barrier, and (II) in response to receiving an indication that the user associated with the user reservation that is at the top of the facility queue has exited the private facility, cause the automatic locking mechanism to prevent access to the private facility via the barrier, and cause the user reservation that is at the top of the facility queue to be removed from the queue.

Example 21

An apparatus comprising: (a) an access control device, wherein the access control device is configured to be communicatively coupled with an automatic locking mechanism providing selective access through an entryway at a private facility; (b) a server configured to store a facility queue, wherein the server is communicatively coupled with the access control device; and (c) a user interface operable to provide a set of instructions that may be executed by a processor, wherein the user interface is configured to be installed on a user device; wherein the server is configured to: (i) receive a user selection indicating a user's intent to access the private facility, (ii) add the user to the facility queue, (iii) send a facility notification to an administrator of the private facility, the facility notification comprising an indication that the facility queue has changed, (iv) cause the user interface to display an indicator of the user's position in the facility queue, and (v) cause the user interface to display an indicator that the user is at the front of the facility queue; and wherein the access control device is configured to: (A) receive an electronic signal indicating that the user is attempting to enter the private facility, and (B) if the user is at the front of the facility queue, disable the automatic locking mechanism.

Example 22

The apparatus of Example 21, wherein the user device is selected from the group consisting of: (a) a mobile computing device; (b) a kiosk computing device; and (c) a point of sale computing device.

Example 23

The apparatus of Example 8, wherein the secondary device is one or more of: (a) an audio device; (b) a video device; and (c) a vending device.

Example 24

The method of Example 18, wherein the secondary device is one or more of: (a) an audio device; (b) a video device; and (c) a vending device.

Example 25

An apparatus comprising: (a) an access control device, wherein the access control device is configured to be communicatively coupled with an automatic locking mechanism providing selective access through an entryway at a private facility; (b) a server configured to store a facility access list, wherein the server is communicatively coupled with the access control device; and (c) a user interface operable to provide a set of instructions that may be executed by a processor, wherein the user interface is configured to be installed on a user device; wherein the server is configured to: (i) receive a user selection indicating a user's intent to access the private facility, and (ii) add the user to the facility access list, wherein the access control device is configured to: (i) receive an electronic signal indicating that the user is attempting to enter the private facility, and (ii) if the facility is currently unoccupied, and if the user is contained within the facility access list, disable the automatic locking mechanism.

Example 26

An apparatus comprising: (a) an access control device, wherein the access control device is configured to be communicatively coupled with an automated barrier providing selective access to a secured area; (b) a server configured to store an authorized user list, wherein the server is communicatively coupled with the access control device; and (c) a user interface operable to provide a set of instructions that may be executed by a processor, wherein the user interface is configured to be installed on a user device; wherein the server is configured to: (i) receive a user selection indicating a user's intent to access the secured area, and (ii) determine if the user is authorized to access the secured area, wherein the access control device is configured to: (i) receive an electronic signal indicating that the user is authorized to access the secured area, and (ii) allowing access via the automated barrier.

Example 27

The apparatus of Example 26, further comprising a set of parking sensors, wherein the automated barrier is a parking facility entry gate, and wherein each parking sensor of the set of parking sensors is configured to sense the presence of a vehicle in a parking spot, wherein the server is further configured to: (a) maintain a list of parking spot vacancies based upon a set of sensor information from the set of parking sensors; (b) identify a vacant spot in response to receiving the user selection; (c) send a description of the vacant spot to the user device.

Example 28

The apparatus of Example 27, wherein the server is further configured to receive a signal indicating that the user intends to return to their vehicle and, in response, send the description of the vacant spot to the user device.

Example 29

The apparatus of Example 26, wherein the user is an employee, wherein the secured area is a storage area, and wherein the user access is determined by verifying that the user is authorized to access the secured area at that time, date, and location.

Example 30

The apparatus of Example 30, wherein the storage area is a medicine storage cabinet and the employee is a medical professional.

Example 31

The apparatus of Example 26, wherein the secured area is a corporate office, and wherein the automated barrier is an elevator that may be boarded to reach the corporate office, wherein the server is further configured to: (a) receive a set of visitor data from a host at the corporate office, the set of visitor data identifying the user as a visitor, and a date and time for a visit; (b) send a meeting confirmation to the user indicating that they may access the corporate office at the date and time for the visit; (c) determine that the user has arrived at the corporate office and, in response, determine that it is the date and time for the visit; (d) send an entry notification to the user indicating that they may proceed to the elevator; (e) in response to the user arriving at the elevator, allowing the user to access the elevator.

Example 32

The apparatus of Example 1, wherein the server is further configured to: (i) receive a priority access request from a requesting user, wherein the requesting user is present at a first position in the facility queue, (ii) provide a request to allow priority access to a set of queued users, wherein the set of queued users are also present in the facility queue, (iii) receive from a granting user, at a second position in the facility queue, via a granting user device, a priority access allowed notification, (iv) move the requesting user to the second position and the granting user to the first position, and (v) notify the requesting user and the granting user of the change in the facility queue; wherein the second position is closer to the front of the facility queue than the first position.

VII. Miscellaneous

The disclosed system and methods may be implemented in different ways, depending on consumer and partner response, and regional acceptance. For example, in some implementations, an end-user may pay a subscription fee in order to be able to quickly locate a clean and accessible private facility. In other implementations, vendor partners that host a private facility may pay a subscription in exchange for customer information and analytics, and the opportunity to promote their goods and services to users accessing their facility that might not otherwise be exposed to their branding and marketing efforts. In some implementations, facility owners and system owners may share the cost of facility construction, in exchange for the system owner specifying the design, fixtures, and devices used within the facility. In this manner, a consistent expectation and experience including branding and marketing messages and images, as well as color schemes, fixtures, and overall design can be maintained across a number of facilities regardless a specific vendor host, leading to an increased user satisfaction and comfort level.

Further variations on, features for, and applications of the inventor's technology will be apparent to, and could be practiced without undue experimentation by, those of ordinary skill in the art in light of this disclosure. Accordingly, the protection accorded by this document, or by any related document, should not be limited to the material explicitly disclosed herein.

For flowcharts or step diagrams that are shown or described as being serial, it should be understood that the steps may instead be performed in parallel unless such an implementation is specifically disclaimed or inherently impossible due to stated dependencies. Likewise, any flowchart or step diagram that is shown or described as being parallel may instead be performed in series or in sequence, unless such an implementation is specifically disclaimed or inherently impossible due to stated dependencies.

When used in the figures, a "for each" step should be understood to function similarly to a for-loop, while-loop, or similar looping logical statement wherein contained steps are repeated until the specified set of circumstances occurs. When used in the figures and written description the terms select, selection, selected, and other variations may not refer to specific technologies, database syntax, or programming languages, and instead refer to a more general process of querying, searching, or identifying a matching or partially matching data set from a larger pool of data.

When used in the written description or claims a "set" should be understood to be a collection of zero or more objects, where an object may be anything that the set is described as containing or may be a set itself.

When used in the written description or claims, a private facility should be understood to mean an area or resource for which there is at least some restriction on access, use, or both.

We claim:

1. An apparatus comprising:
   (a) an access control device, wherein the access control device is configured to be communicatively coupled with an automatic locking mechanism providing selective access through an entryway at a private facility;
   (b) a server configured to store a facility queue, wherein the server is communicatively coupled with the access control device; and
   (c) a user interface operable to provide a set of instructions that is executable by a processor, wherein the user interface is configured to be installed on a user device;
   wherein the server is configured to:
      (i) receive a user selection indicating a user's intent to access the private facility,
      (ii) add the user to the facility queue,
      (iii) send a facility notification to an administrator of the private facility, the facility notification comprising an indication that the facility queue has changed,
      (iv) cause the user interface to display an indicator of the user's position in the facility queue, and
      (v) cause the user interface to display an indicator that the user is at the front of the facility queue; and
   wherein the access control device is configured to:
      (i) receive an electronic signal indicating that the user is attempting to enter the private facility from the user device,
      (ii) determine whether the user is physically present at the entryway based upon the electronic signal; and
      (iii) if the user is at the front of the facility queue and physically present at the entryway, disable the automatic locking mechanism.

2. The apparatus of claim 1, wherein the server is further configured to add the user to the facility queue in response to receiving an electronic signal indicating that the user has arrived at the private facility.

3. The apparatus of claim 1, wherein the user interface is further configured to, in response to an interaction by the user, cause the user device to emit the electronic signal indicating that the user is attempting to enter the private facility.

4. The apparatus of claim 1, further comprising an automatic door opener in communication with the access control device, wherein the automatic door opener is configured to move the barrier from a closed position that prevents entry to the private facility to an open position that allows entry to the private facility when the automatic locking mechanism is disabled.

5. The apparatus of claim 4, wherein the access control device is further configured to receive an electronic signal indicating that the user is within the private facility and, in response to the electronic signal indicating that the user is within the private facility:
   (i) cause the automatic door opener to move the barrier to the closed position that prevents entry, and
   (ii) enable the automatic locking mechanism.

6. The apparatus of claim 1, wherein the access control device is further configured to receive an electronic signal indicating that the user is within the private facility from the user device and, in response to the electronic signal indicating that the user is within the private facility, activate a secondary device.

7. The apparatus of claim 1, wherein the access control device is further configured to:
   (i) receive an electronic signal indicating that the user has exited the private facility, and
   (ii) in response to receiving the electronic signal indicating that the user has exited the private facility, send a feedback notification to the server; and
   wherein the server is configured to:
   (i) in response to receiving the feedback notification, cause the user interface to display a request for feedback, and
   (ii) receive a feedback response from the user via the user interface.

8. The apparatus of claim 1, wherein the server is further configured to:
   (i) receive a priority access request from a requesting user, wherein the requesting user is present at a first position in the facility queue and the priority access request indicates that the requesting user would like to move forward in the queue relative to the first position,
   (ii) provide a request to allow priority access to a set of queued users, wherein the set of queued users are also present in the facility queue and ahead of the requesting user in the facility queue,
   (iii) receive from a granting user, at a second position in the facility queue, via a granting user device, a priority access allowed notification,
   (iv) move the requesting user to the second position and the granting user to the first position, and
   (v) notify the requesting user and the granting user of the change in the facility queue;
   wherein the second position is closer to the front of the facility queue than the first position.

9. A method comprising the steps of:
   (a) providing a user interface that is configurable on a user device;

(b) receiving, at a server, a user selection indicating a user's intent to access a private facility;

(c) adding the user to a facility queue stored on the server;

(d) sending a facility notification to an administrator of the private facility, the facility notification comprising an indication that the facility queue has changed;

(e) causing the user interface to display an indicator of the user's position in the facility queue;

(f) causing the user interface to display an indicator that the user is at the front of the facility queue;

(g) receiving, at an access control device from the user device, an electronic signal indicating that the user is attempting to enter the private facility;

(h) determine whether the user is physically present at a barrier of the private facility based upon the electronic signal; and (i) if the user at the front of the facility queue and physically present at the barrier, disabling an automatic locking mechanism, wherein the automatic locking mechanism is configured to prevent the barrier from being moved, and wherein the barrier is configured to prevent access to the private facility.

10. The method of claim 9, further comprising the step of causing the user interface to:
(i) display a set of private facilities, and
(ii) for each of the set of private facilities:
  (A) a location, relative to the user, and
  (B) a distance, relative to the user.

11. The method of claim 9, wherein adding the user to the facility queue comprises adding the user to the facility queue in response to receiving an electronic signal indicating that the user has arrived at the private facility.

12. The method of claim 9, wherein the facility notification further comprises a request that a good or service that is not available within the private facility be made available to the user upon arrival at the private facility.

13. The method of claim 9, further comprising the step configuring the user interface to, in response to an interaction by the user, cause the user device to emit the electronic signal indicating that the user is attempting to enter the private facility.

14. The method of claim 13, further comprising the step of causing an automatic door opener to move a barrier from a closed position that prevents access to the private facility to an open position that allows access to the private facility when the automatic locking mechanism is disabled.

15. The method of claim 14, further comprising the step of configuring the access control device to:
(i) receive an electronic signal indicating that the user is within the private facility, and
(ii) in response to the electronic signal indicating that the user is within the private facility:
  (A) cause the automatic door opener to move the barrier to the open position, and
  (B) enable the automatic locking mechanism.

16. An apparatus comprising:
(a) an access control device, wherein the access control device is configured to be communicatively coupled with an automated barrier providing selective access to a secured area;
(b) a server configured to store an authorized user list, wherein the server is communicatively coupled with the access control device; and
(c) a user interface operable to provide a set of instructions that is executable by a processor, wherein the user interface is configured to be installed on a user device;
(d) a set of parking sensors;
wherein the automated barrier is a parking facility entry gate, and wherein each parking sensor of the set of parking sensors is configured to sense the presence of a vehicle in the parking spot;
wherein the server is configured to:
  (i) receive a user selection indicating a user's intent to access the secured area, and
  (ii) determine if the user is authorized to access the secured area,
  (iii) maintain a list of parking spot vacancies based upon a set of sensor information from the set of parking sensors;
  (iv) identify a vacant spot in response to receiving the user selection;
  (v) send a description of the vacant spot to the user device;
wherein the access control device is configured to:
  (i) receive an electronic signal indicating that the user is authorized to access the secured area, and
  (ii) allowing access via the automated barrier.

\* \* \* \* \*

UNITED STATES PATENT AND TRADEMARK OFFICE
CERTIFICATE OF CORRECTION

| | |
|---|---|
| PATENT NO. | : 9,984,520 B1 |
| APPLICATION NO. | : 15/194700 |
| DATED | : May 29, 2018 |
| INVENTOR(S) | : Frances Heller et al. |

It is certified that error appears in the above-identified patent and that said Letters Patent is hereby corrected as shown below:

On the Title Page

Item (72) Inventors:
The inventor, Nicolas M. Bonnet's address reads: "Palo Also, CA (US)"; which should be deleted and replaced with "Palo Alto, CA (US)".

Signed and Sealed this
Twenty-eighth Day of May, 2019

Andrei Iancu
*Director of the United States Patent and Trademark Office*